United States Patent [19]

Harris et al.

[11] Patent Number: 5,347,135
[45] Date of Patent: * Sep. 13, 1994

[54] METHOD AND APPARATUS EMPLOYING A LINEAR ARRAY IR REGION RADIATION DEVICES FOR LOCATING THE POSITION OF CONVEYOR TRANSPORTED PRODUCTS

[75] Inventors: David E. Harris, Powell; Brent E. Bowman, Hilliard, both of Ohio

[73] Assignee: Harris Instrument Corporation, Columbus, Ohio

[*] Notice: The portion of the term of this patent subsequent to Jun. 15, 2010 has been disclaimed.

[21] Appl. No.: 41,792

[22] Filed: Apr. 1, 1993

Related U.S. Application Data

[63] Continuation-in-part of Ser. No. 720,260, Jun. 24, 1991, Pat. No. 5,220,177.

[51] Int. Cl.$^5$ .................... G01N 21/86; G01V 9/04
[52] U.S. Cl. .................................. 250/548; 250/561
[58] Field of Search ............ 250/205, 548, 557, 560, 250/561, 223 R; 356/375, 381, 382, 384–387

[56] References Cited

U.S. PATENT DOCUMENTS

| | | | |
|---|---|---|---|
| 3,448,278 | 8/1966 | O'Brien | 250/219 |
| 3,567,320 | 3/1971 | Chitayat | 356/4 |
| 3,574,411 | 12/1974 | Zanoni | 356/167 |
| 3,653,770 | 4/1972 | Yamamuro | 356/160 |
| 3,724,958 | 4/1973 | Callan | 356/160 |
| 3,739,177 | 6/1973 | Ro | 250/206 |
| 3,781,115 | 12/1973 | Rader et al. | 356/167 |
| 3,856,412 | 12/1974 | Zanoni | 356/167 |
| 4,088,411 | 5/1978 | Ahlquist et al. | 356/167 |
| 4,123,169 | 10/1978 | Merilainen et al. | 356/167 |
| 4,300,836 | 11/1981 | Holmes et al. | 356/376 |
| 4,360,274 | 11/1982 | Norton-Wayne | 356/394 |
| 4,427,295 | 1/1984 | Nishiyama | 356/371 |
| 4,461,576 | 7/1984 | King | 356/375 |
| 4,465,937 | 8/1984 | Forbes | 250/560 |
| 4,499,383 | 2/1985 | Loose | 250/561 |
| 4,521,112 | 6/1985 | Kuwabara et al. | 356/375 |
| 4,555,633 | 11/1985 | Bjorkelund | 250/560 |
| 4,559,451 | 12/1985 | Curl | 356/237 |
| 4,559,452 | 12/1985 | Igaki et al. | 250/560 |
| 4,648,718 | 3/1987 | Sadamitsu et al. | 356/387 |
| 4,679,941 | 7/1987 | Fujita | 356/384 |
| 4,680,806 | 7/1987 | Bolza-Schünemann | 382/65 |
| 5,006,719 | 4/1991 | Blaser | 250/560 |
| 5,220,177 | 6/1993 | Harris | 356/381 |

OTHER PUBLICATIONS

Bi-Directional Analogue Optical Transmission Using Semiconductor Junction Transceivers R. I. MacDonald, Electronic Letters Feb. 1979, vol. 15 No. 4 pp. 122–123.

*Primary Examiner*—David C. Nelms
*Assistant Examiner*—Stephone B. Allen
*Attorney, Agent, or Firm*—Mueller and Smith

[57] ABSTRACT

An improved edge detection and location system of a variety wherein a linear array of radiation emitting devices are selected to emit in the infrared region of the visible spectrum. The emitter array component is employed in conjunction with a silicon photovoltaic receiver and the combination permits greatly expanded spacing between the emitter component and receiver component of the system. A system highly immune to environmental radiation noise is provided which includes an array of IR region emitters performing in conjunction with the same form of IR emitting devices but configured within a photoreceptor circuit. Enhanced edge detection accuracy is achieved through the utilization of multiple rows of emitting devices arranged in parallel and mutually offset by an amount less than the center-to-center spacing of adjacent such devices. An on-site calibration technique is described for calibrating the systems at their intended location so as to achieve uniformity of radiation intensity at the receiver components under conditions of non-attenuation of that radiation.

26 Claims, 14 Drawing Sheets

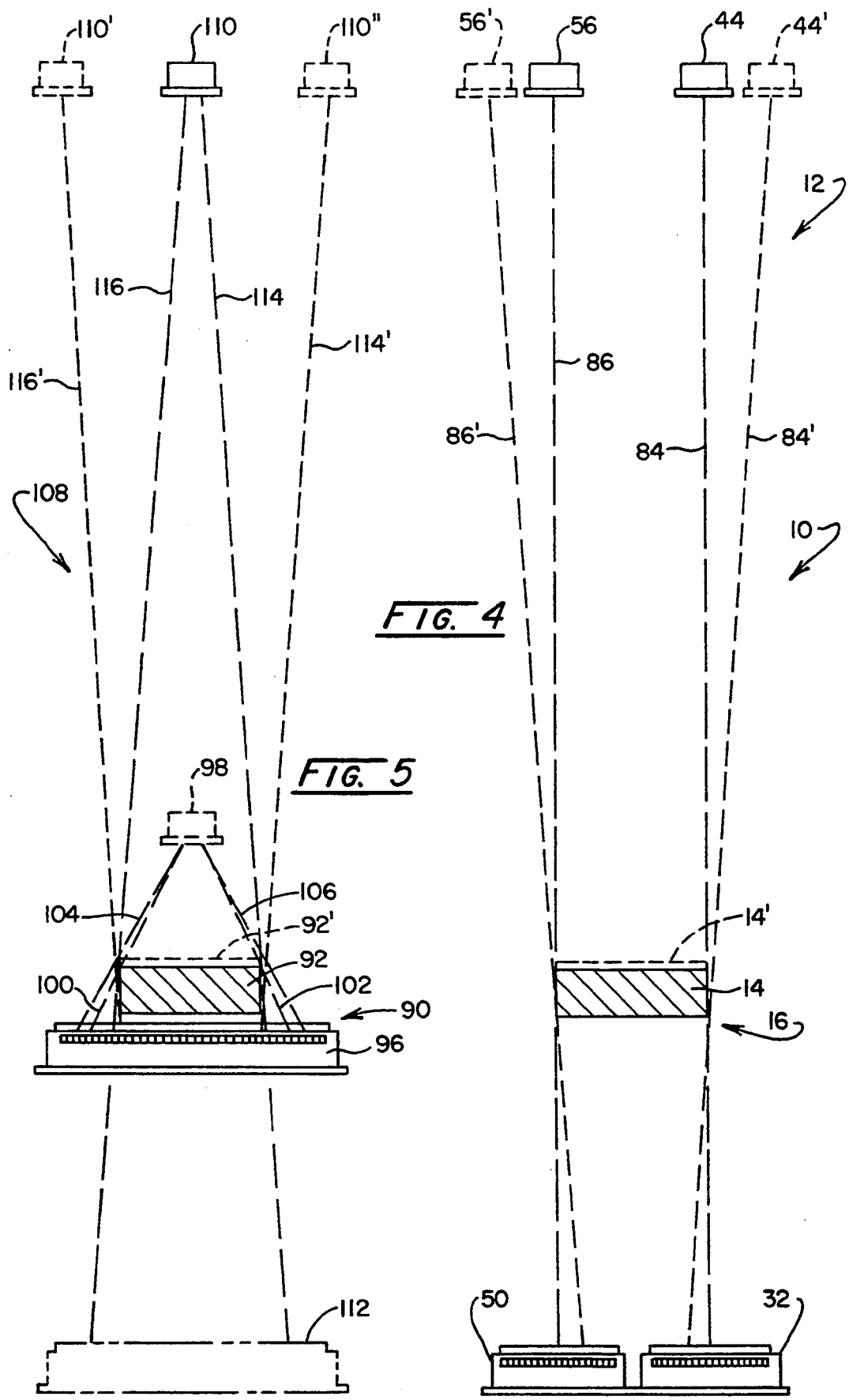

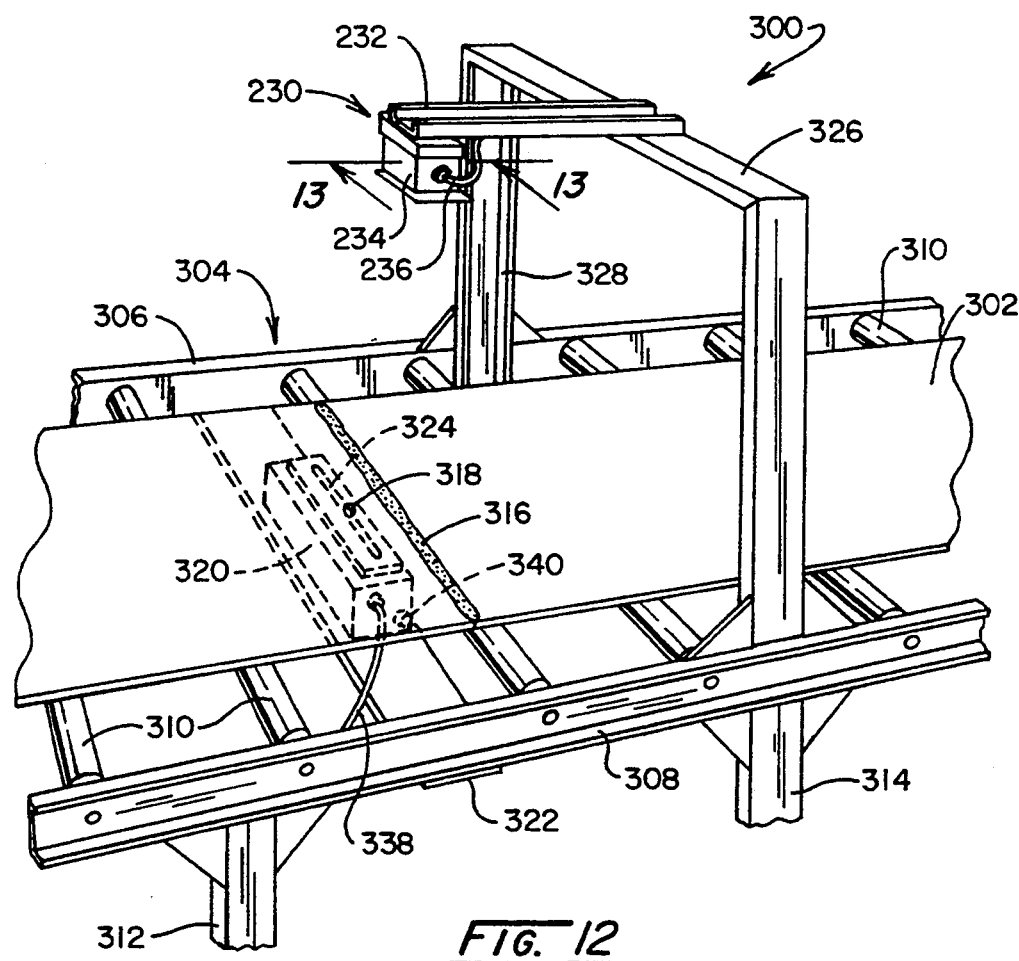
FIG. 12
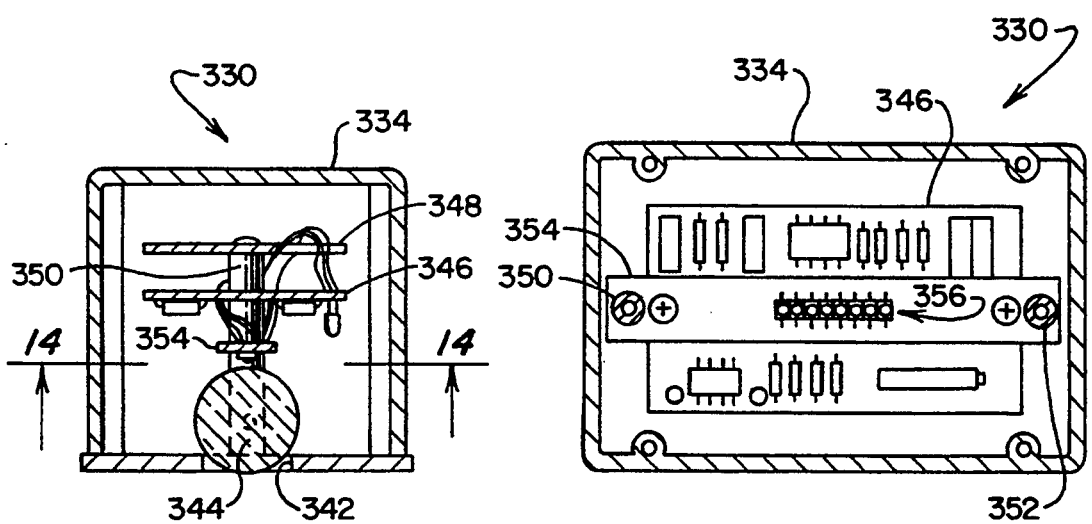
FIG. 13
FIG. 14

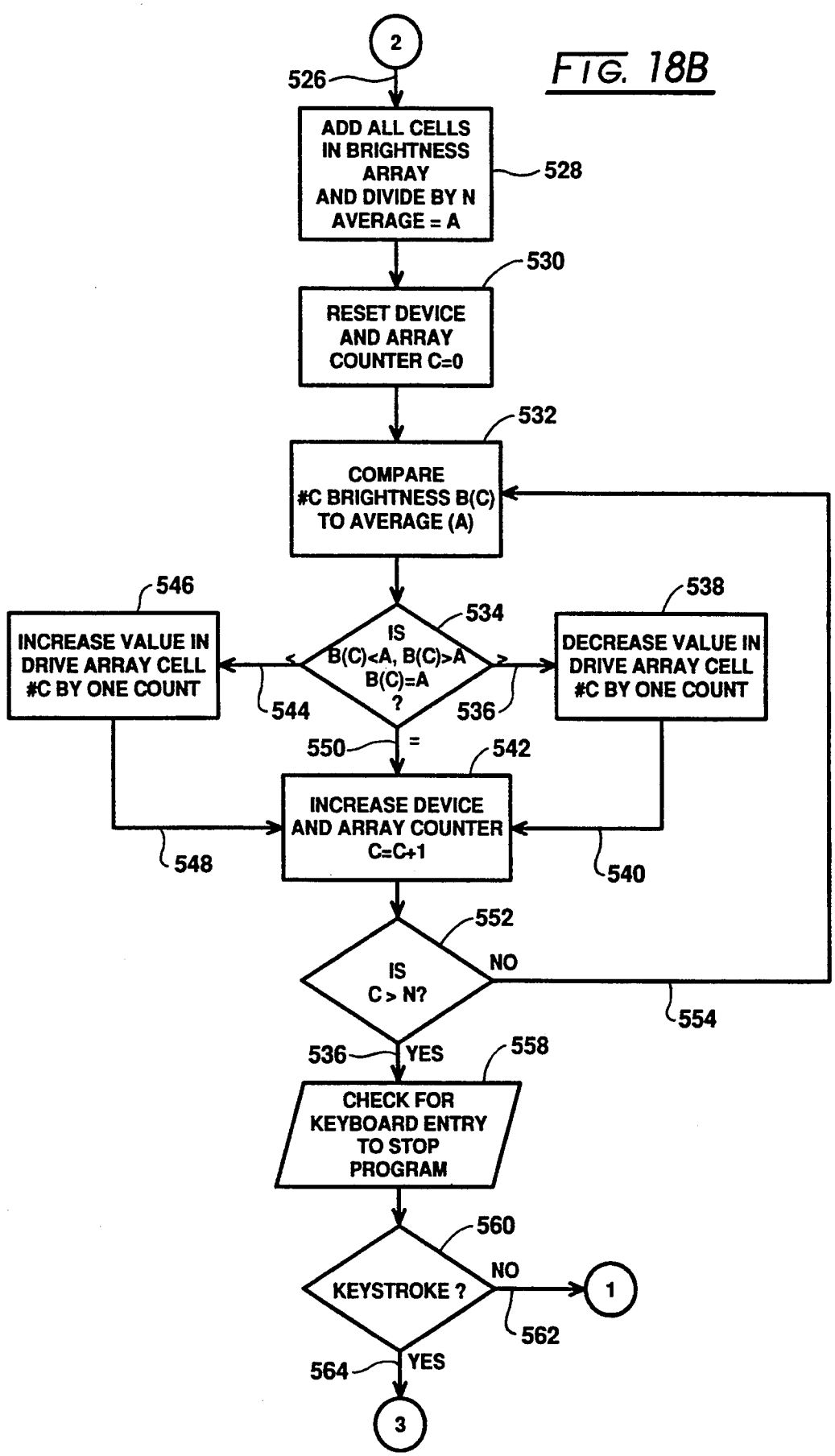

METHOD AND APPARATUS EMPLOYING A LINEAR ARRAY IR REGION RADIATION DEVICES FOR LOCATING THE POSITION OF CONVEYOR TRANSPORTED PRODUCTS

CROSS REFERENCE TO RELATED APPLICATIONS

This application is a continuation-in-part of application for U.S. patent Serial No. 07/720,260, by David E. Harris, entitled "Method and Apparatus for Edge Detection and Location, filed Jun. 24, 1991, assigned in common herewith now U.S. Pat. No. 5,220,177, issued Jun. 15, 1993.

BACKGROUND OF THE INVENTION

A significant component of industrial production involves web or sheet material movement generally linearly along conveyor systems. Materials undergoing these production procedures vary widely in density, chemical make-up, and the like, for example, from thin, transparent plastics to steel billets heated to incandescence. Speed of movement of these materials varies widely from the barely discernible to very fast, for example, temper mills in the steel industry often will convey sheet steel at speeds of about 90 mph. Essentially all such processes call for some form of guidance control. Widthwise measurement of moving sheet material often is called for in addition to a variety of position monitors. In the latter case, procedures for galvanizing or electroplating steel call for providing a continuous steel strip. Accordingly, successive sheet ends of this material are butt-welded together within an accumulator facility whereupon the welded unions are ground smooth and the resultant region of each union is marked for detection and subsequent removal by the positioning of a small hole in the sheet somewhere within its central region.

The environment under which sheet material conveyance is undertaken vary widely. Moving sheet webs are coated with photographic emulsions under highly refined environments designed to protect the halide chemistry of the coatings. Correspondingly, emergent steel typically is hot to the level of incandescence, for example about 3100° F., such that position monitoring instrumentation must be supported far enough away to avoid its thermal destruction. In contrast, sheet aluminum production may involve, for example, a production environment of lower temperature but employing sprayed liquids including cutting fluids and kerosene which flow as foam and froth not only over the treated material but necessarily over monitoring instrumentation.

The development of position or dimension monitoring instrumentation for such processes has represented an elusive task for investigators. However, success has been achieved for certain of these environments and materials. A measurement system which has found substantial acceptance in industry is marketed under the trademark "SCAN-A-LINE". This system employs a linear array of light emitting diodes positioned on one side of a material such as a web or sheet moving within a production process. The diodes of this array are illuminated in a scanning sequence having a stable time base, for example, at a 20 KHz rate developed by a quartz crystal oscillator. Positioned above the moving material under production and opposite the associated diode array is a tuned photoresponsive receiver which reacts to the illumination emanating from those diodes which are unblocked or partially blocked at the edges of the moving material. The receiver and its associated controls then are called upon to carry out an extrapolation process to develop edge position. This extrapolation is based upon the observation that each LED in the emitting array produces a cone of light and the light cones from adjacent LEDs overlap each other in the light path to the receiver. An edge of the product being measured blocking the light path from the emitting diodes to the receiver will attenuate the light from more than one diode. The processing procedure carrying out extrapolation takes samples of the amplitude of the light received in sequence from the partially blocked and unblocked LEDs and develops a time-based stairstep light output pattern representing a scan across the edge which, in effect, is smoothed through the utilization of low pass filtering. The edge position of the material being observed then is defined as the time equivalent point on this smooth curve signal where the voltage drops to one-half of the peak LED signal amplitude. The "SCAN-A-LINE" system is marketed by Harris Instruments Corporation of Columbus, Ohio.

Harris, in application for U.S. patent Ser. No. 07/720,260 (supra) describes an improved "SCAN-A-LINE" system wherein each light emitting device of the array utilized is energized by a unique drive current which is pre-selected to cause the emission of light exhibiting substantially uniform intensity at the receiver when there is no attenuation of the light by the material under edge evaluation. Such balancing or optimization of the array light output not only achieves an importantly enhanced system accuracy in carrying out edge location, but it also substantially expands the range of application for such non-contacting measurement techniques. In this regard, the edge locating technique can be employed with transparent or semi-transparent materials. When so employed, the time-based trigger signal from which edge data is developed is generated at a location in scan time between a transition of detected amplitudes representing a maximum value and a minimum value. System accuracy is substantially improved additionally through the utilization of a receiving photo-detector assembly having a lengthwise dimension which is expanded. With the combination of this improved receiving approach and the balanced light values at the receiver, system performance has been observed to be improved beyond what would be expected.

A desirable aspect of the edge detecting and monitoring technique developed by Harris resides in its relatively lower cost as compared to other systems. Thus, where the approach can be expanded to successful utilization in different industrial environments and with different industrial materials, considerable advantage will accrue to industry. Obstacles facing the investigator looking to these environments are of numerous varieties. For example, where in-plant vehicles are utilized within the manufacturing environment carrying the sheet materials to be evaluated, those vehicles generally will have strobe lights mounted upon them in consequence of government mandated safety requirements. The strobe light is a device which broadcasts a spectrum which injects highly disruptive noise into the receiving components of edge monitoring systems. For example, should a strobe carrying vehicle be moved into adjacency with a monitor utilized to find the above-discussed holes indicating a union of two sheet components, the system generally will provide false data as to the presence of one of those hole indicators. Because of the spacing limitation between light source and receiver in the present system, they have been withheld from utilization in conjunction with the detection of heated materials such as steel ingots. Additionally, the infrared output form such materials when heated to incandescence would tend to disturb receiving components. Similarly, where the systems would be employed in environments where the emitters are impeded, for example, where they are continuously subject to foam and liquids, the resultant attenuation of light is so excessive as to render the light based edge detection monitors impractical.

SUMMARY

The present invention is addressed to an improved method and apparatus for enhancing the accuracy and range of application of edge detecting and locating systems of a variety wherein output paths of an array of light emitting devices are attenuated at the edge of the material being monitored. Through the employment of semi-conductor device based arrays emitting in the infra-red region of the electromagnetic spectrum in conjunction with silicon photocell receiver components, substantially expanded stand-off distances and spacing between the receiver component and emitter component are made available. This enhanced spacing permits improved edge detection of hot materials such as steel billets. Of additional advantage, the improved ray trace geometry achieved with enhanced emitter-to-receiver spacing achieves enhanced edge location accuracy at the pass line where vertical movement of the material may be encountered. This ray trace geometry further permits an advantageous lower outside edge detection where the edges of relatively thick material forms such as billets of steel are monitored. For such applications, multiple receiver components may be employed with one or more emitter components. The improved system also finds applicability within rigorous production environments where edge detection within cascades of fluid and foam is called for.

Another aspect of the invention looks to the employment of these edge detector systems within environments of radiation-based noise. These environments typically will be derived form in-plant vehicle mounted strobe lights, incandescent steel and fluorescent illumination. For these applications, the system uniquely employs an array of devices emitting in the infrared range of the electromagnetic spectrum at a predetermined wavelength. The receiving components working with this emission utilizes the same devices, but within a photoreceptor circuit configuration. Preferably, these photoreceptor configured devices, if emitting, would emit at the same predetermined wavelength.

Another feature of the invention looks to an emitter array or architecture which serves to improve edge detection resolution. This improved resolution is achieved through the utilization of multiple parallel and adjacent rows of emitting devices, all of which are arranged in parallel to the scan path of the system. The devices in each row are offset along the scan path from adjacent rows by a select distance. This offset distancing preferably represents a portion, such as a fraction, of the center-to-center spacing of the emitter devices within a linear array.

Performance of the edge detector and locator systems also is enhanced through the utilization of an on-site calibration for the emitter drive circuits. By the inclusion of certain components including a flash analog-to-digital converter and battery backed random access memory, the systems can be calibrated to achieve a uniform radiation intensity at the receivers during conditions of non-attenuation of such radiation while at the location of their intended use. Thus, calibration can accommodate for spurious reflections and other unforeseen environmental conditions. Additionally, the approach provides a flexibility to the user to alter the geometry of a given installation in accordance with production demands and readily recalibrate the systems.

Other objects of the invention will, in part, be obvious and will, in part, appear hereinafter.

The invention, accordingly, comprises the apparatus, system and method possessing the construction, combination of elements, arrangement of parts, and steps which are exemplified in the following description.

For a fuller understanding of the nature and objects of the invention, reference should be had to the following detailed description taken in connection with the accompanying drawings.

BRIEF DESCRIPTION OF THE DRAWINGS

FIG. 4 is a diagrammatic view showing the advantageous effect of expanded spacing between emitter and receiver components for a dual system embodiment of the invention;

FIG. 5 is a diagrammatic representation showing the advantage of enhanced spacing between receiver and emitter components of the system of the invention and additionally showing advantages accruing through the utilization of dual receivers;

FIG. 12 is a partial perspective view of apparatus according to the invention showing its employment in the location of marker openings within steel material;

FIG. 13 is a sectional view taken through the plane 13—13 in FIG. 12;

FIG. 14 is a sectional view taken through the plane 14—14 in FIG. 13;

FIGS. 18A–18C combine to provide a flow chart showing a program employing the apparatus of FIG. 17 to carry out the balancing of discrete emitter components within an array thereof employed with the apparatus of the invention.

DETAILED DESCRIPTION OF THE INVENTION

The attributes of the present invention permit an advantageous expansion of the industrial applications for edge locating systems of a variety utilizing a scanned array of radiation emitting devices in conjunction with an oppositely disposed photoresponsive receiver. For example, edge detection and location now can be carried out with industrial processes which, for example, move steel billets at incandescent temperatures along conveyor or which are carried out in environments where industrial fluids, froths, and the like necessarily must fall upon the detecting equipment. Further, the system may be used in conjunction with a variety of web-coating industrial processes utilizing photosensitive halide emulsions and the like. In the discourse to follow, two such processes are described as exemplary, both in the field of steel production. The description then turns to a technique for calibrating the system to achieve a highly desirable uniform intensity of radiation at the overhead receiving component under conditions of non-attentuation.

Figure 1:
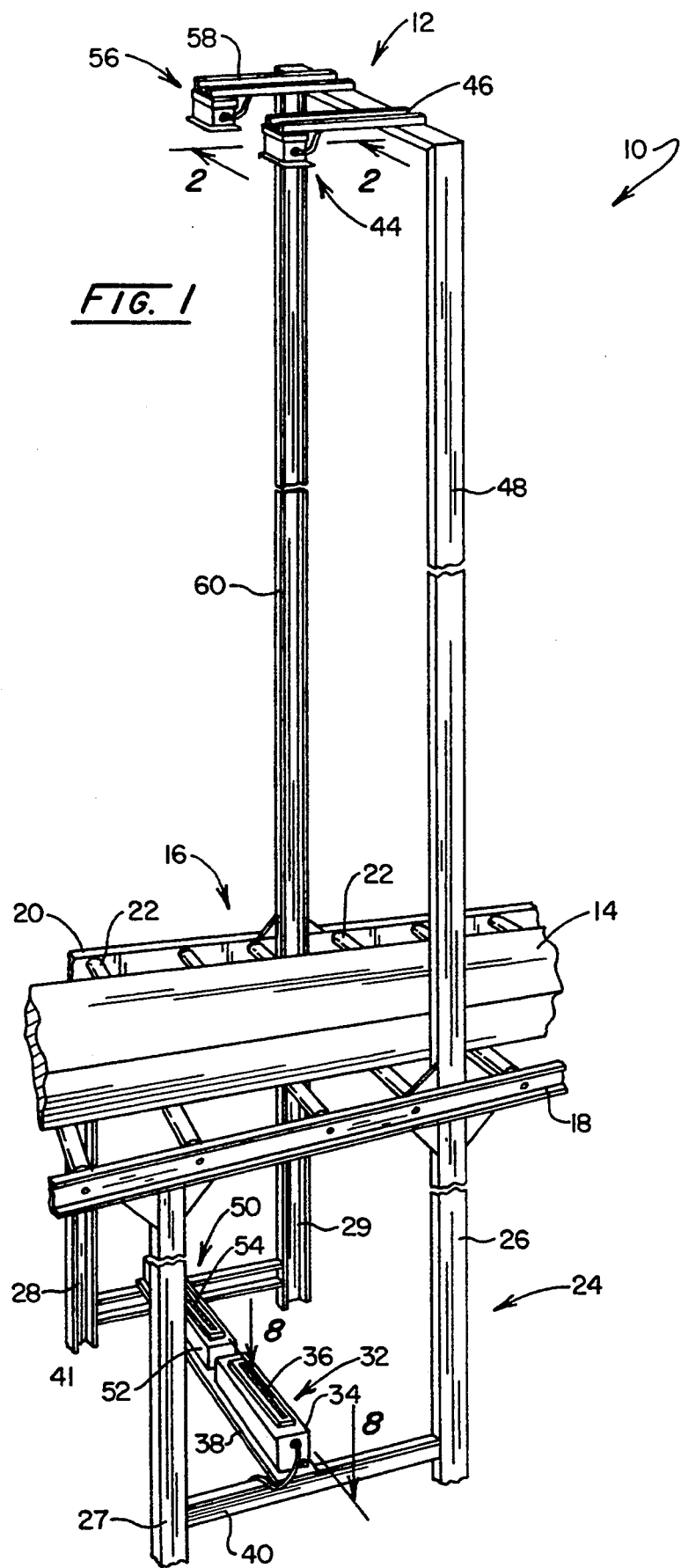
FIG. 1 is a partial perspective view of apparatus according to the invention showing its employment in the edge detection of materials.

Looking to FIG. 1, the apparatus of the invention is represented generally at 10. Apparatus 10 is illustrated as being installed in a steel manufacturing facility wherein the steel billets at very high temperatures are within a process wherein they are guided along a conveyor line. With this form of implementation of the apparatus, in effect, two edge guiding systems may be employed as are represented in general at 10 and 12. In this regard, each outside edge of a billet 14 is monitored by the two systems 10 and 12, the bottom of those edges are monitored, inasmuch as there is less vertical variance of those lower edges. Billet 14 is seen being moved along a conveyor 60 having side supports 18 and 20 which, in turn, support a plurality of conveyor rolls, certain of which are identified at 22. Side supports 18 and 20 typically are mounted upon an underlying support structure as represented at 24 which is seen, for example, to incorporate columns 26–29.

With the exception of a fight-left reversal, edge locating systems 10 and 12 are identical. In this regard, system 10 is seen to include an emitter component 32 which includes a housing 34 within which are supported a linear array of semiconductor junction devices configured to emit radiation in the infrared (IR) region of the electromagnetic spectrum. This radiation emission is transmitted through a planar lens mounted within a slit or elongate opening 36. Housing 34 is seen mounted so as to position the opening 36 transversely to the direction of travel of the billet 14 and at a location such that it extends from a location underneath the bottom edge of billet 14 to a location positioned outwardly from that edge. Such mounting is provided by mounting member 38 extending between two cross members 40 and 41 of structure 24. For the application shown, the emitter component 32 is located, for example, about 2 meters below the bottom edge of billet 14.

Positioned well above the emitter component 32 is a receiver component 44 mounted upon a brace 46 which is, in turn, supported upon a post 48. The stand-off distance or distance between the receiver component 44 and the conveyor 16 advantageously is quite lengthy, for example about 7 meters. This very elongate stand-off distance, heretofore impossible to achieve with such systems, permits a highly stable edge detection and location, even though the thickness and/or vertical positioning of the product such as the billet at 14 may vary at what is referred to as the "pass line". This pass line is the plane through which radiation from the opening 36 impinges upon the bottom side of billet 14 and is seen as it extends beyond the outside edge thereof by the receiver 44. Device 44, at the noted elongated stand-off distance, is well away from the destructive effects of the heat radiated from such products as billet 14. Preferably, the center of the radiation detection components within receiver component 44 is centered over the extreme outwardly located emitting device of the array at opening 36.

Edge detecting and locating system 12 is substantially identical to that at 10. In this regard, it includes an emitter component 50 having a housing 52 mounted upon mounting member 38 and having an elongate slit or opening 54 incorporating a planar lens beneath which is a linear array of radiation emitting semi-conductor junction devices emitting in the infrared region. Positioned in alignment above emitter 50 is a receiver component 56 which is mounted upon a brace 58, in turn, extending from a post 60 such that the center of its radiation responsive devices is over the outer emitting device of component 50. Thus mounted, the receiver 56 is located at a stand-off distance identical with that associated with receiver 44.

The array of radiation emitting devices incorporated within the emitter components as at 32 or 50 will vary in length depending upon the application at hand. For some, sheet material edge evaluations, the array will be continuous between the two ends and extend outwardly from each such end. The accuracy of measurement achieved with the systems is enhanced as the density or number of emitting devices per unit length is increased. Generally, the array will be formed of modular groupings of the devices, for example, a module of 10 or about 100. Some of the devices are available at 100 mils spacing, however, they have been fabricating having, for example, a 50 mils center-to-center spacing. These devices are individually sequentially energized to emit radiation for one-half cycle of a 20 KHz clock or scanning frequency. When the last device in such an array has been energized and then turned off, a reset signal is generated to begin the sequence again at the first device of the array. This reset signal generally is referred to as the "sync pulse". As the individual devices of the array are energized in scanning fashion and the radiation emitted progresses from a non-attenuated outside region or edge of the material being measured such as billet 14, a variation of the peak intensity of emitted radiation for this scan region will be witnessed at the associated receiver as at 44 or 56. This variation in attenuation results in the generation of a "stairstep" form of waveform which is processed by low pass filtering to achieve a smooth curve. The midpoint of this curve then is detected to evolve a time-based trigger pulse which may be employed by readout or control systems to determine the location of an outside edge or for applications determining widthwise extent, the width between opposite edges of the sheet material. This extrapolation procedure is improved; for example, by increasing the linear density of emitting devices along the scan path; by carrying out a calibration wherein the emitted radiation is made uniform for each emitting device at the receiving component; and by elongating the photoresponsive receiving component.

Figure 2:
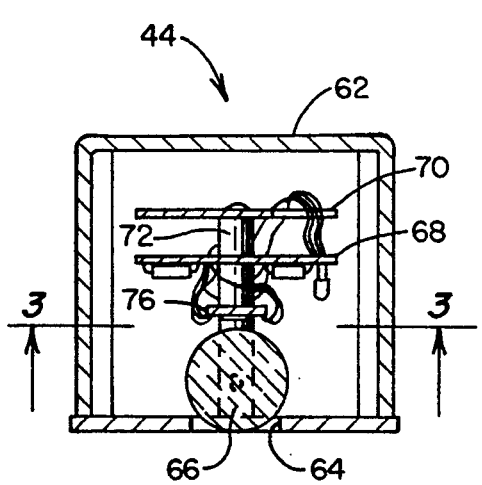
FIG. 2 is a sectional view taken through the plane 2—2 of FIG. 1.
Figure 3:
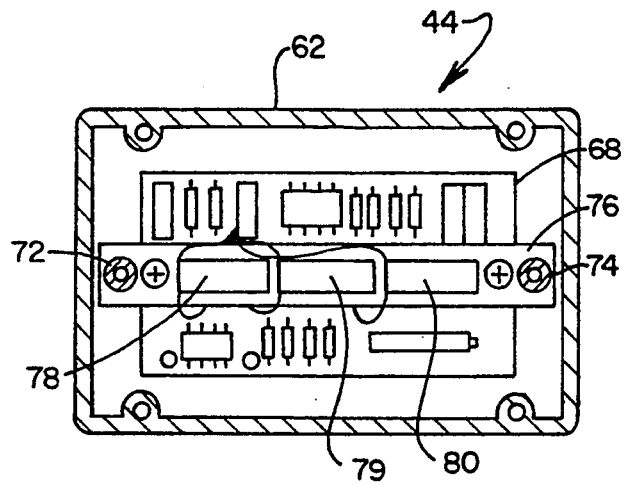
FIG. 3 is a sectional view taken through the plane 3—3 of FIG. 2.

Looking to FIGS. 2 and 3, internal details of the receiver 44 are revealed. Receiver 44 is seen to include a rectangular housing 62 having an elongate rectangular opening therein at (>4. This opening 64 is aligned in parallel with the corresponding opening 36 of the emitter component 32 as seen in FIG. 1. Over opening 64 there is located an elongate, cylindrical radiation gathering lens 66 which serves to restrict the radiation region sought to be evaluated to the general vicinity of the emitter array at opening 36 in emitter component 32. Above the lens 66, a circuit board as at 68 and a shield 70 are seen to be supported upon stand-offs 72 and 74, as seen particularly in FIG. 3. Located intermediate the lens 66 and circuit board 68 is a support board 76 which is seen in FIG. 3 to support three rectangular silicon solar cells 78–80 in a linear array. Cells 78–80 may be provided, for example, as type 52PBHL produced by Applied Solar Energy Corp., or as part number 703-0242-0 marketed by Advance Opto Electonics, Inc. of Los Angeles, Calif. The cells 78–80 are coupled in parallel and are in mutual adjacency. Each of the cells 78–80 has a lengthwise extent of 2 cm and, thus, is coupled in a grouping of 3 in the linear array shown, the length of the photoresponsive components amounts to about 6 cm. Substantial improved performance has been witnessed by the addition of these three cells developing the noted overall cell length. This improved performance is considered to stem principally from the increased amount of data made available in terms of the number of emitting devices of the array at the emitter 32 which are responded to as "seen" by the silicon detectors 78–80. Because of this, more data is available for the extrapolation procedure carried out by the system 10. The incorporation of more emitter components per length of scanning pathway also is seen to improve the system through the addition of data for edge detection and location analysis. To render the receiver units as at 44 and 56 substantially immune from environmental noise manifested, for example, as fluorescent lighting, strobe lights, and the like, a filter may be positioned over the entrances as at 64 to these devices which confronts all radiation impinging thereon and passes only radiation within the infrared region of the electromagnetic spectrum. While there is a modicum of attenuation of the emitted radiation within that region of the spectrum, noise manifested by environmental lighting is substantially removed with such an arrangement.

The capability for installing the systems 10 and 12 at a relatively lengthy standoff distance also improves edge detection and location accuracy features at the path line where variations in thickness are encountered or the mode of conveyance necessarily results in a sheet of material being moved vertically. Such condition of variations of height or thickness of the material will occur, for example, where the edge positions of material entering the top of a roll are being evaluated and the roll progressively increases in diameter as the process continues. Looking to FIG. 4, the effect, for example, of the variation in thickness of the billet 14 is represented stylistically, for example, that thickness or vertical movement or the top level of the billet itself may move upward to position 14' shown in the figure. With the much larger stand-off distance involved and the further enhanced distance between the emitter, for example, at 32 and the receiver at 44, a ray trace may be envisioned for radiation emanating from a given device within array 32 and represented by the dashed line ray trace 84. Note that the variation in height or thickness of the billet 14 essentially has no effect upon the propagation of ray trace 84. A similar condition obtains with respect to the edge detecting and locating system 12. In this regard, a ray trace represented by dashed line 86 representing radiation emanating from a device within the array 50 and impinging at receiver 56 is essentially unaffected or, at best, dismissively affected by variations in thickness of the billet 14 or movement of its upper surface.

Particularly for thick materials such as the billet 14, it is desirable that the systems 10 and 12 monitor a bottom outside edge. This readily is achieved by aligning receiver component 44 such that its center sensor 79 is symmetrically aligned over the outside emitter device of the array of emitter component 32. This is demonstrated in FIG. 4 by receiver component position 44' with ray trace 84' and receiver component position 56' with ray trace 86'.

The advantages accruing from the substantially expanded distance between the receiver and emitter components additionally may be portrayed in conjunction with a system wherein a singular receiver is utilized in conjunction with an emitting system which extends outwardly from each outside edge of a sheet or material being conveyed having a thickness variation or a vertical movement at the pass line. In FIG. 5, an edge locating and detecting system of relatively short spacing between the emitter and receiving components is represented generally at 90. The material being conveyed within this system 90 is represented in cross section at 92 and variations in its thickness or vertical position at the pass line may be represented, for example, by dashed line 92'. A linear array of radiation emitters is represented at 96 in conjunction with a singular receiving component shown in phantom at 98. Note in the figure that a ray trace which is tangent to the upper edge of the device represented at 92 may be described by dashed lines 100 and 102. These ray traces 100 and 102 are seen to emanate from a radiation emitting device such as a photodiode which is at a position four diodes in from the outermost diodes of the emitter component 96. Should the material under evaluation 92 then change in thickness or alter at the pass line to the location 92', the edge will have been detected principally by ray traces represented at dashed lines 104 and 106 which emanate from radiation emitting devices positioned only two stations inwardly from the outermost one. Thus, the validity of edge locating data will be adversely affected by this vertical movement. By contrast, if the receiver 98 is moved to establish an expanded system represented generally at 108, having an expanded stand-off distance, for example such as replaced by receiver component 110 and with system 108, should the emitting component 96 be moved to the position represented in phantom at 112, ray traces locating the outside edges of material 92 may be represented by dashed lines 114 and 116. Note that there is essentially no change in the location of the ray traces 114 and 116 with respect to the movement of the material from the solid representation at 92 to the phantom representation at 92'. In effect, the alteration of thickness or vertical position at the pass line becomes dismissible in terms of an alteration of the accuracy of edge location.

Bottom outside edge detection also may be achieved with the single emitter and expanded standoff geometry of FIG. 5. In this regard, receiver component 110 may be replaced by two, spaced apart receivers shown at 110' and 110". The center of the photoresponsive elements of receivers 110' and 110" are centered over the corresponding outermost emitter devices of emitter component 90, i.e. the first and last diode emitters. With the arrangement as shown at ray traces 114' and 116', the bottom outside edges of material 92 readily are detected and located.

Figure 6:
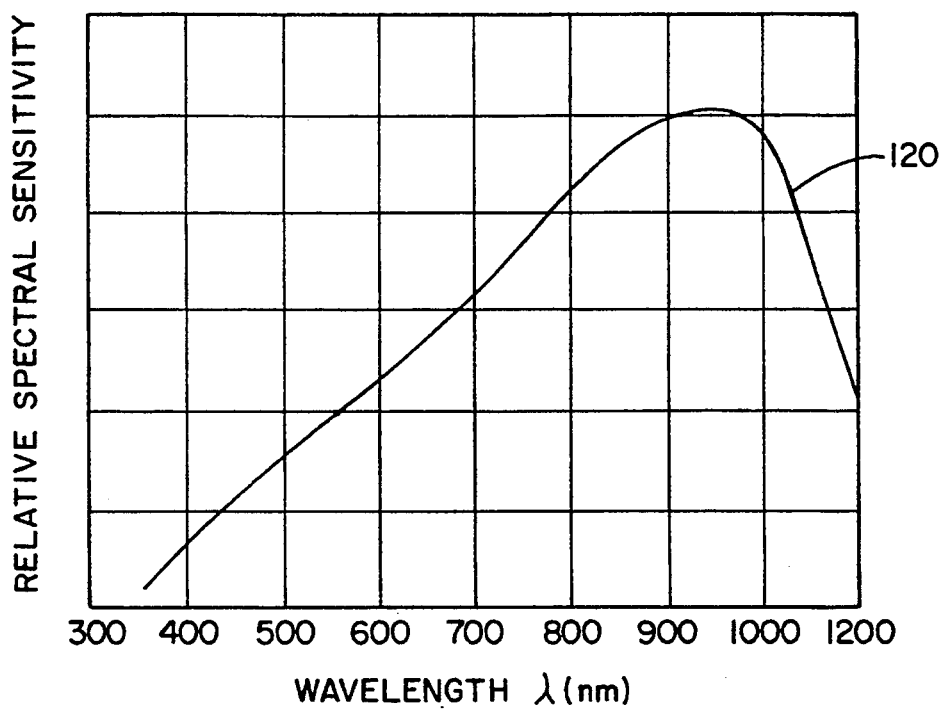
FIG. 6 is a graph relating relative spectral sensitivity versus impinging radiation wavelength for a silicon-based receiving arrangement according to the invention.

Referring to FIG. 6, a sensitivity curve plotting relative spectral sensitivity to wavelength for silicon devices such as at 78-80 is revealed at 120. Curve 120 reveals that, even though these devices are sensitive to and respond to light within the visible region of the electromagnetic spectrum, there is a peak response characteristic in the infrared region of that spectrum. Thus, where, for example, gallium-arsenide (IR)semiconductor junction devices or are employed with the emitting component, the resultant radiation will show peak intensities at wavelengths from about 880 nm through about 1000 nm. Where the silicon receiving devices are employed with gallium arsenide IR emitting diodes, an unexpected improvement in response for the system at hand is realized permitting greatly expanded stand-off distances.

Figure 7:
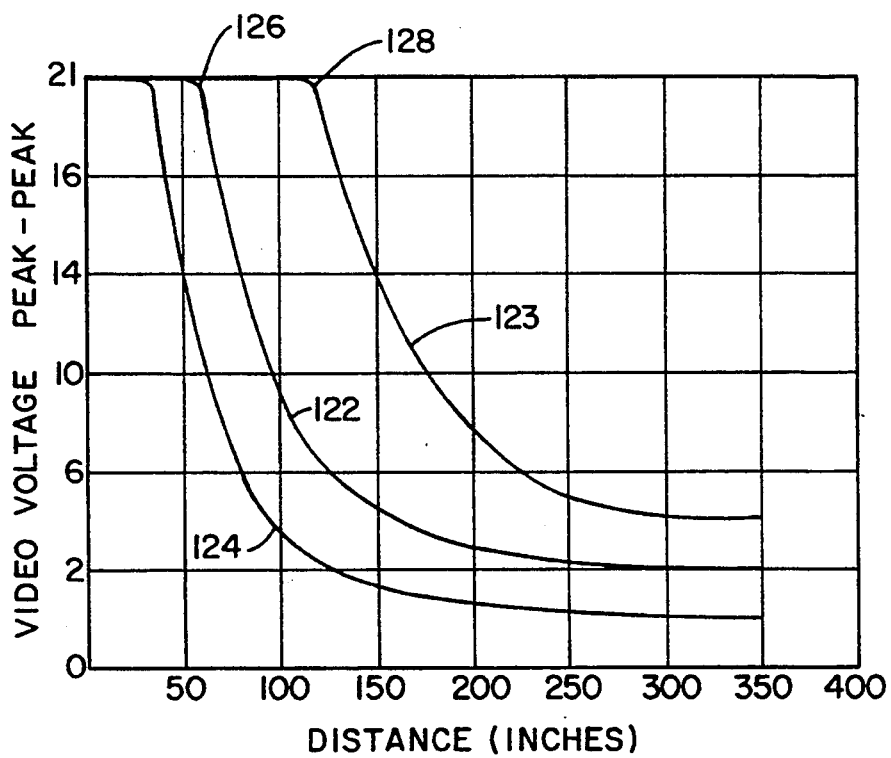
FIG. 7 is a graph relating peak-to-peak video voltages from a receiver with respect to the spacing of an associated emitter for three system configurations.

Referring to FIG. 7, a series of curves 122-124 are revealed which represent the plotted results of tests carried out utilizing the present system employing gallium-arsenide devices providing outputs in the infrared region of the electromagnetic spectrum as compared to pre-existing systems which employ photodiode emitters having outputs in the visible region of the electromagnetic spectrum. In this regard, the curve 122 was derived utilizing an emitter structure employing a single row of light emitting diodes having outputs in the visible region and within emitter structures incorporating cylindrical lenses selected for enhancing the output of these devices with respect to focusing their outputs toward the receiver components. Those receiver components were structured as represented in FIGS. 2 and 3. The outputs of the receivers, herein termed a "video" voltage signal, measured on a peak-to-peak basis, were evaluated in conjunction with the alteration of the spacing in inches between the receiver component and the emitter component. The tests were undertaken within an environment more protective than that which may be encountered in a typical factory. In this regard, no fluorescent lamination was present which would otherwise affect the outputs and no strobe light outputting devices were present. Curve 122, representing visible region illumination shows that the amplifiers of the receiving device were saturated through the position represented at 126, the system leaving saturation at about a 20 v output representing a spacing of about 60 inches. Curve 122 then drops off relatively sharply such that at about 100 inches spacing, the peak-to-peak video signal will have dropped to about 9 volts. This is a good, readable signal, however, experience has shown that in the presence of fluorescent illumination or in an environment where strobe lights are being energized, such ambient interference will substantially negate the value of that reading. However, under the controlled conditions at hand, a good reading was still available at about 175 inches. While the signal remained detectable above noise at a distance of 300 inches, the value of the signal was dismissible in view of the noise characteristics of the circuitry itself. The latter noise occurs, for example in the amplification stages, may be thermally induced or the like.

Curve 123 shows the system described heretofore utilizing a single row array of gallium-arsenide photodiodes emitting in the IR region of the electromagnetic spectrum in conjunction with the silicon receiving devices as, for example, at 78-80. With this arrangement, however, no cylindrical lens was used with the infrared-based emitter component. Curve 123 reveals that saturation continued to point 128, again representing about 20 volts but at a distance of about 120 inches, a distance double that corresponding with point 126 in conjunction with curve 122. Considering the law of radiation energy propagation, a square function becomes involved in terms of the output at the receiving component. In effect, the relative energy value at the receiver represents a 400% increase over the system employing emitters in the visible region of the electromagnetic spectrum. The last reading made with the test arrangement was at 330 inches, a distance limited by the extent of cabling available to the investigators. While the intensity of signal is decreasing at that spacing, the curve 123 is quite flat and a doubling of the spacing, for example to 600 inches, would be required in order to see a decrease in signal on the order of $\frac{1}{4}$ of its value.

A highly desirable aspect attendant with the use of an emitter component employing semiconductor junction devices emitting in the infrared region of the electromagnetic spectrum has been found in applications within the aluminum industry. In particular, where sheet aluminum is being conveyed within a tempering and cutting process, the process fluid including cutting fluids and kerosene will cascade over the process falling upon the emitter component. This unusual environment has been found not to preclude the effective performance of the IR-based system, the IR region radiation passing through such effluvia to permit the accurate carrying out of edge location evaluation.

An enhanced accuracy in edge location also may be achieved through the enhancement of the number of radiation emitting devices positioned along the scan pathway of the systems. An approach to achieving improved densities of these emitting devices within the constraints of current limits on fabrication densities is revealed in FIG. 8. In the figure, for examplary purposes, emitter component 32 is shown in section as including housing 34 and elongate opening 36. The outside edge of billet 14 is reproduced in phantom. Generally for the instant embodiment, sheet material requiring accurate edge location would be the subject matter evaluated. Cabling drive input to the radiation emitting devices is represented by connector 140, while a second electrical input is provided for calibration purposes through a cabling connector 142, each of the aforesaid connectors extending through housing 34.

Figure 8:
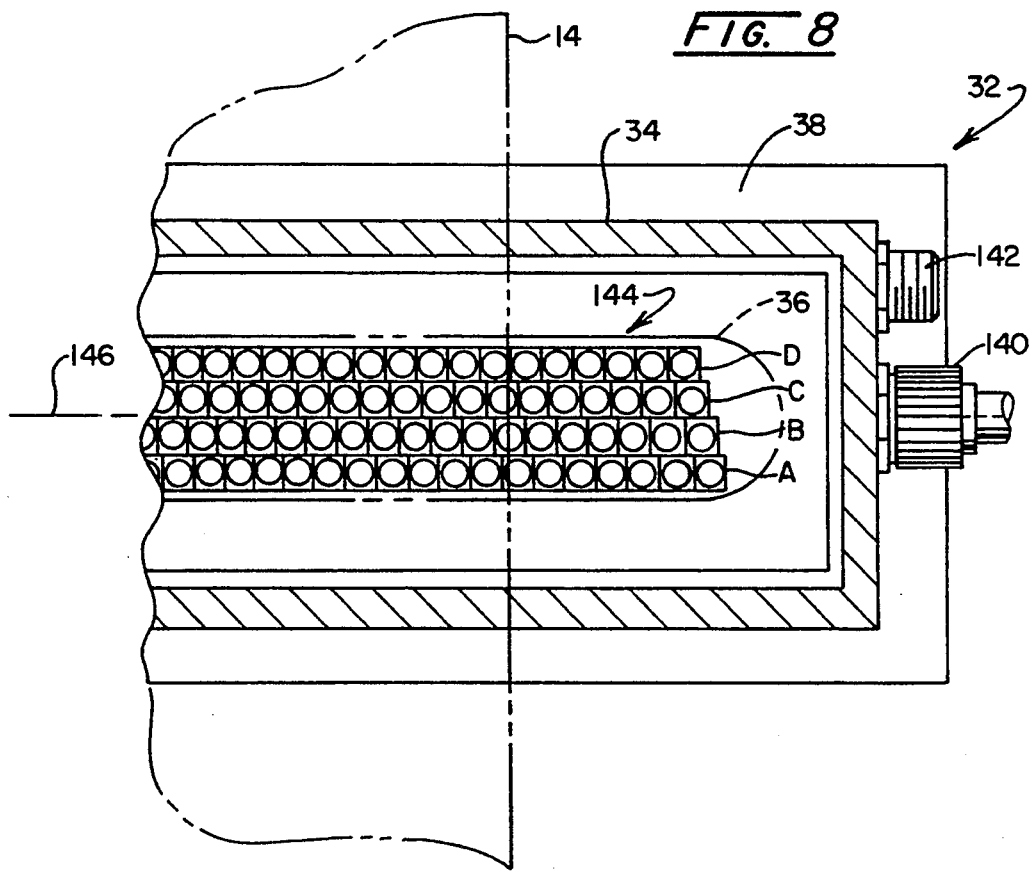
FIG. 8 is a sectional view taken through the plane 8—8 of FIG. 1.

The array of radiation emitting devices shown in FIG. 8 is represented generally at 144 behind the opening 36. Within the array 144, four linear rows of emitting devices are seen arranged in parallel and identified at A–D. Each of the rows A–D are mutually offset and parallel with a scan path represented by the central axial line 146. Where the device-to-device spacing for any given one of the rows A–D is, for example, 50 mils center-to-center, row B may be offset from row A one-fourth of that spacing or 10 mils. Correspondingly, row C may be offset still another 10 mils along pathway 146 with respect to row B and row D may be offset from row C still another 10 mils. The scanning sequence then progresses with the first of the devices in each row commencing with row A. Thus, the first devices of these rows will be scanned or energized in the sequence A, B, C, D, and the scan then will return to the second device of row A and repeat the sequence. With such a multi-row approach, the resolution achieved with the system is increased by a factor of four. In general, the approach illustrated by the figure is untilized in connection with the edge detection of thin web materials and the like, as opposed to materials such as billet 14. The illustration of FIG. 8, representing a sectional view of a portion of FIG. 1, is used for convenience of description.

Figure 9:
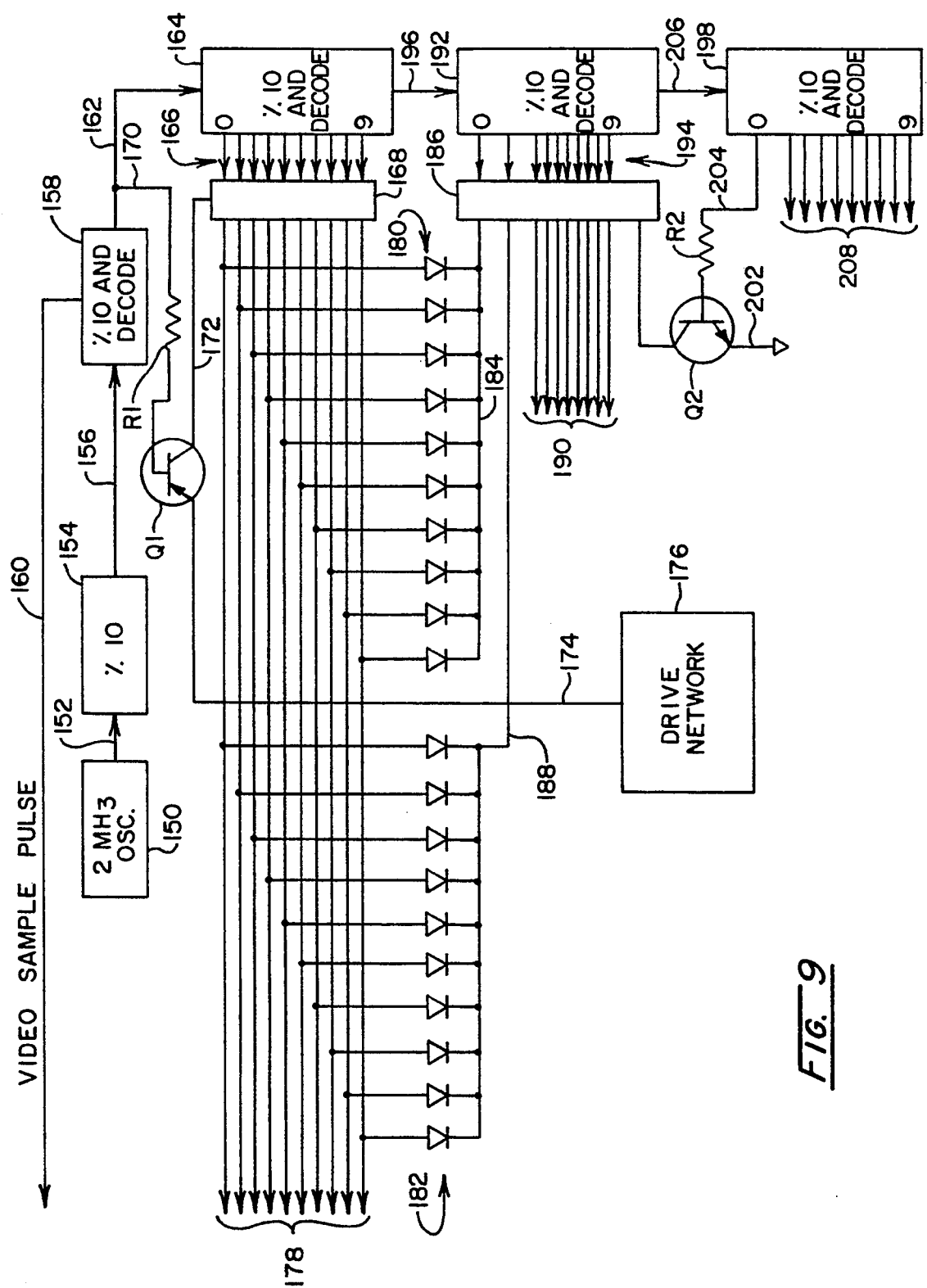
FIG. 9 is a schematic block diagram of a control arrangement for carrying out the energization of radiation emitting devices of an array thereof employed with the apparatus of the invention.

Referring to FIG. 9, a generalized block and schematic diagram of the time base and radiation emitter device selection or multiplexing and driving components of the systems as at 10 or 12 is provided. A quartz crystal oscillator represented at block 150 provides a stable 2 MHz output which is submitted, as represented by arrow 152 to a divider represented at block 154. Divider 154 carries out a divide-by-10 function to provide a 200 KHz signal at line 156 which, in turn, is directed to another divide-by-10 network represented at block 158. Network 158 also carries out a decode function, for example 0 through 9, a select stage of which, for example, the fourth output stage, is tapped as represented by line 160 to generate a video sample pulse which will occur substantially at the mid-point of excitation of any given radiation emitting device of the emitter components as at 32 or 50. The carry output of network 158 is tapped at line 162 to provide a system frequency 20 KHz signal which is directed to the input of a unit decoder represented at block 164. With the arrangement shown, the outputs 0 through 9 of decoder 164 at line array 166 will be activated in sequence at the noted 20 KHz system frequency. The lines of array 166 are directed to a corresponding array of buffer transistors represented at block 168 which, in turn, receive emitting device excitation current through PNP transistor Q1. Note in this regard, that the base of transistor Q1 also is coupled through base resistor R1 and line 170 to line 162 carrying the system 20 KHz signal input to units decoder 164. The collector of transistor Q1 is coupled via line 172 to a common connection with the corresponding collectors of the buffer transistors at array 168. Transistor Q1 functions to supply energizing or drive current to the semi-conductor junction emitting devices (diodes) of the emitter component, for example as at 32. In this regard, it does so on a discrete diode-by-diode basis wherein the level or value of that current is pre-selected to achieve a desired balance of illumination intensity for an unattenuated condition at a corresponding receiver, for example, that at ,14. Drive is supplied to the transistor Q1 at its emitter input at line 174 which, in turn, is coupled with the output of a drive network represented at block 176. Accordingly, the monitored and controlled current applied from line 174 to transistor Q1, in turn, is applied to the elected transistor buffer stage at array 168 in conjunction with each positive going half cycle of the 20 KHz system frequency signal at line 162 as asserted at the base of transistor Q1 from line 170.

With the arrangement shown, drive current is applied from tranistor Q1 at a 50% duty cycle to the buffer transistors of array 168 which, in turn, selectively and in sequence, energize the leads of a units bus represented generally at 178. Each of the leads of bus 178 may, for example, be coupled with a discrete module formed as an array of a given number of radiation emitting devices, for example 10. For the multi-row and offsetting arrangement represented in FIG. 8, the connections are made from the bus 178 to appropriate sequential ones of the devices in the row A–D sequence described. In the figure at hand, the leads of bus 178 may be seen coupled in sequence to, for example, an array 180 of 10 gallium arsenide infrared region emitting diodes as well as a second such array as at 182. The anodes of each emitting diode are coupled with an appropriate lead of the bus 178 and the cathodes thereof are commonly connected for each array. In this regard, the cathodes of device array 180 are connected by line 184 to the first position of an array of buffer drivers represented at block 186. Similarly, the array of emitting devices 182 is coupled via line 188 to a next succeeding output of the buffer array 186. In addition to lines 184 and 188, an additional eight leads as shown generally at 190 may be connected to the succeeding groupings of radiation emitting devices to provide for their selection by enablement through the buffer array 186. This sequential enablement is derived by a divide-by-10 counter and decoder 192, providing outputs through line array 194 to buffer array 186. This counter and decoder 192 is driven from an input line 196 at 2 KHz which is the carry output of decoder 164. Thus, up to 100 radiation emitting devices may be selected with the system. Where the array of radiation emitting devices employed contains more than 100 such devices, then a hundreds selection procedure is carried out by select enablement of buffers at array 186 utilizing NPN transistor Q2 in conjunction with a divide-by-10 counter and decoder 198. This selective enablement to buffer 186 is shown at line 200 extending to the collector of transistor Q2. The emitter of transistor Q2 is coupled to ground via line 202, while the base thereof is coupled through base resistor R2 and line 204 to the 0 output stage of decoder 198. Decoder 198, in turn, is seen to be driven from the carry output of decoder 192 as represented by line 206. Thus, the number of radiation emitting devices may be expanded, in terms of groups of 10, to larger size in modular fashion through the enablement of a hundreds value output of decoder 198. Generally, hundreds selection is carried out by appropriate jumpering to transistors such as that at Q2 via the decoder output line array, the additional outputs of which are represented at array 208.

Figure 10:
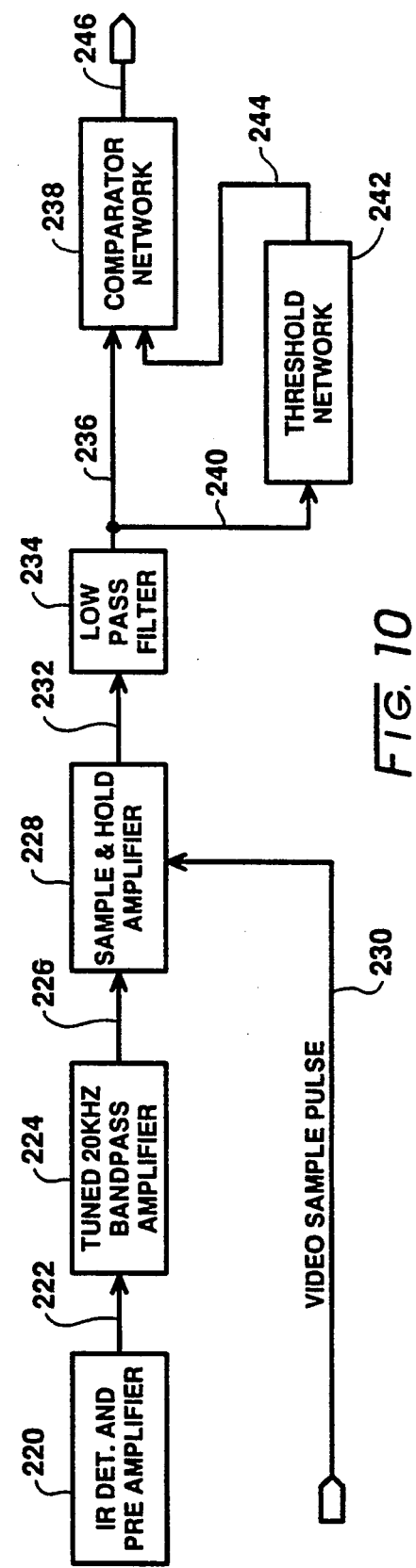
FIG. 10 is a block diagrammatic representation of signal treatment for the implementation of the invention in edge location with respect to opaque materials.

Now looking to the evaluation carried out with respect to the receiver components as at 44 and 56, in general, a trigger point is determined corresponding with an evaluation of the amplitudes of an over-edge scan to thus derive a time-based edge location signal. Where materials are utilized which are opaque to the emitted radiation, the trigger point corresponds with 50% of the peak amplitude of an over-edge scan. Looking to FIG. 10, a general block diagram of this approach to edge detection with opaque materials is set forth. The radiation detection function and preliminary or pre-amplification function is represented at block 220 as providing a video signal output from a balanced pre-amplifier at line 222 to a tuned 20 KHz band pass amplifier. That filtered output is then presented, as represented at line 226, to a sample and hold amplifier represented at block 228. Sample and hold amplifier 228, activated by the video sample pulse generated at line 160 (FIG. 9) and now represented at line 230, samples of the output of amplifier stage 224 in conjunction with the enabling pulse from line 230. The video sample pulse at that line represents a timed input corresponding with the presence of what essentially is the center point of the sample representing a radiation pulse being evaluated. The signals are then, as represented at line 232, passed through low pass filter stage 234 to line 236. The low pass filter 234 functions, in effect, to smooth an otherwise stairstep-shaped curve resulting form scanning across the edge of the material to be evaluated. Line 236 is directed to the negative input of a comparator represented at block 238. The line also is tapped by line 240 which is directed tot he input of a threshold network deriving a threshold output at line 244 representing 50% of the peak amplitude of the signal at line 236. This value at line 244 is directed to the comparator network such that a time-based edge evaluation may be presented at line 246 for presentation to a process control monitoring system.

Where transparent or semi-transparent materials are under evaluation, a very small difference may exist between the output of a radiation emitting device which is fully covered by the material under evaluation and the output of a device of the array which is fully fully uncovered. The differences in amplitudes may be as small as 7% to 10%. To derive a threshold trigger point for such transparent and semi-transparent materials, 50% of the difference between the maximum and minimum video signals seen during an edge scan is employed.

Figure 11:
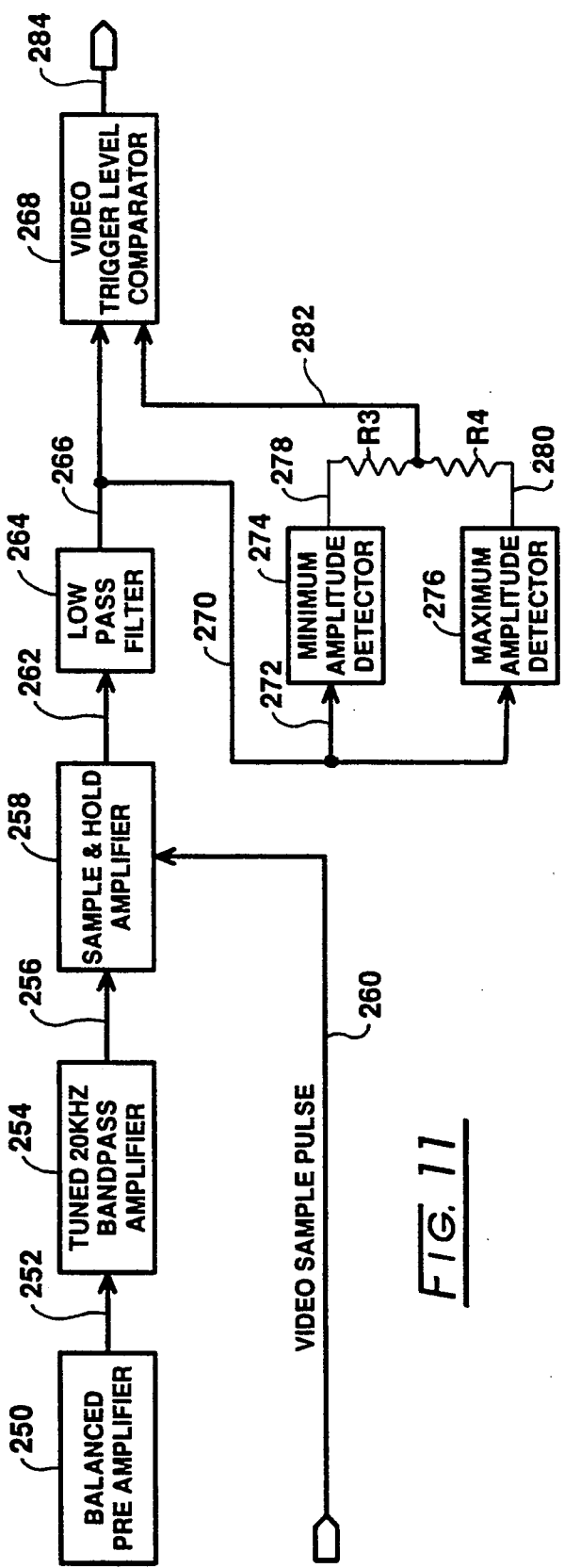
FIG. 11 is a block diagrammatic representation of signal treatment for the implementation of the present invention in edge location with respect to transparent and semi-transparent materials.

Referring to FIG. 11, a general block diagram of the components employed with the transparent and semi-transparent measurement or edge detection approaches is set forth. The photodetecting function and balance pre-amplification is represented at block 250 as providing a video output signal at line 252. This video signal at line 252 is directed to a turned 20 KHz band pass amplifier represented at block 254. The thus-filtered output at line 256 is directed to a sample and hold amplifier represented at block 258. Amplifier 258 then samples the output of the amplifier stage 254 at line 256 in conjunction with an enabling pulse from line 260 corresponding with lien 160 described in conjunction with FIG. 9. The video sample pulse at line 260 provides a timed input corresponding with the presence of what essentially is the center point of the sample representing a radiation pulse being evaluated. The signals, then, as represented at lien 262 are passed through a low pass filter stage represented at block 264 which directs the smooth curve resultant signal from scanning across the evaluated material via line 266 to the negative input of a comparator represented at block 268. Output line 266 is tapped at line 270 which, through line 272, is seen to be directed to a minimum amplitude detector function represented at block 274. This minimum amplitude detector defines the minimum attenuated signal value, i.e. representing a radiation emitting device which is transmitting entirely through the transparent or semi-transparent material. Line 270 addition is seen being directed to a maximum amplitude detector function represented at block 276. This detector finds the maximum value signal, i.e. that signal which is unattenuated by the material being evolved. The resultant outputs of functions 274 and 276 are presented, as represented at respective lines 278 and 280, to a voltage divider function represented by resistors R3 and R4. The resultant signal at line 282 represents a value of voltage halfway between the minimum amplitude as detected and the maximum amplitude as detected. This then serves as the trigger level or threshold level introduced to the positive input of the comparator function 268. A resultant edge defining signal then is developed at line 284 upon the level of the signal at line 266 reaching the threshold level asserted from line 282. This aspect of the system, permitting the edge detection of transparent and semi-transparent materials results principally from the earlier noted balancing of the output intensity of the emitting devices at the receiver component. A more detailed description of the circuitry employed in conjunction with the emitter component and receiver component of the system at hand is provided in the above-noted application for U.S. patent Ser. No. 07/720,260 by Harris, entitled "Method and Apparatus for Edge Detection and Location", filed Jun. 24, 1991, assigned in common herewith, now U.S. Pat. No. 5,220,177, issued Jun. 15, 1992. That patent is specifically incorporated herein by reference.

Another aspect of the invention looks to the employment of emitter semi-conductor junction devices such as gallium-arsenide diodes as the photoreceptor of a receiver component. These radiation responsive devices are the same as and are used with galliumarsenide radiation emitting devices. However, for the receiving function, these same devices are combined within a photoreceptor configured circuit. Preferably, the peak emitting wavelength of the semiconductor junction device used within the receiving component will be selected such that if employed as an emitter, they would emit the same wavelength as is actually emitted from the corresponding devices of the emitter component. For example, where radiation at a wavelength of 880 nm is emitted from the emitter component, then the photoreceptor configured circuit should incorporate semiconductor junction devices which. if within an emitter circuit would emit radiation at that same 880 nm wavelength. Among the advantages of this combination is an unusually effective rejection of otherwise interfering radiation. For example, the IR emitter-IR receiver arrangement may be employed with materials which are incandescent. A system employing this arrangement has been utilized, for example, to detect the edges of a 200 watt lightbulb. No alteration in edge detection sensitivity occurs between measurements wherein that lightbulb is energized and where it is turned off. The unusual combination for emitter and receiver has particular value in the steel industry where strobe devices are around the production process which would otherwise saturate the receiving systems. For example, it is not desirable that such receiving systems be saturated when edge detecting sheet materials moving at high speed, i.e. 120 feet per second or where it is desired to detect the presence of a marker opening within sheet material to locate the position of a butt weld connecting two sheets.

Returning momentarily to FIG. 7, curve 124 shows the plotted results of a test utilizing the infrared region emitter described in connection with the test deriving curve 123 and a receiver component which incorporated gallium-arsenide photodiodes normally employed for errfitting radiation in the infrared region of the spectrum. A single row linear array of eight such diodes was employed with the test and, as in the case of curve 123, no cylindrical lens was positioned before the emitter diodes. In replacement of that lens, a plano lens was employed. Curve 124 shows receiver amplifiers leaving saturation at about 35 inches of spacing, whereupon the sensitivity drops to provide a last good reading at about 100 inches. This shows satisfactory performance for a variety of applications where a substantial amount of environmental light-based noise is present, particularly such noise as is evoked from strobe light illumination.

Referring to FIG. 12, an exemplary embodiment for utilizing gallium-arsenide junction semiconductor devices which normally are employed to emit in the IR region within a receiver component in conjunction with an emitter component incorporating the same form of devices is revealed. In particular, the system represented generally at 300 in FIG. 12 is employed to detect marker holes or openings within sheet steel within a galvanizing process. A continuous sheet of steel 302 is illustrated as being supported for movement upon a conveyor 304. Conveyor 304 is seen to have side supports 306 and 308 between which are mounted conveyor rolls, certain of which are identified at 310. The conveyor 304 is seen supported upon a bottom structure including such components as columns 312 and 314. Steel sheet 302 is seen to actually represent two linearly contiguous sheets which have been butt welded together at a butt weld 316. It is necessary to detect these weld positions such that they can be removed from the material following its processing to avoid damage to presses and the like forming the sheet steel into manufactured items. To locate these butt welds, the industry provides a marker hole as at 318 which may have a diameter, for example, of about ⅜ inch (0.95 cm). This marker hole 318 is located in a centrally disposed region of the sheet 302 and normally poses a problem of detection inasmuch as the sheet 302 may be passing along the conveyor 304 at speeds of, for example, 60 mph. The movement of a factory tug or forklift having a periodically energized strobe light to the vicinity of this detection arrangement generally will evoke a false identification of the hole. With the instant system 300, that anomaly is overcome. System 300, as before, includes an emitter component 320 supported from the conveyor 304 in adjacency with the sheet 302. The component 320 includes a housing 322 and an upwardly-disposed elongate slot or slit 324 carrying a plano lens beneath which is an array of semiconductor junction devices arranged linearly and emitting in the infrared region of the electromagnetic spectrum. Note that the housing 322 is somewhat foreshortened so as to encompass the region wherein the marker openings 318 may be expected to appear. Column 314 is seen to extend upwardly to a cross-brace 326 which is supported at the opposite side of conveyor 304 by a column 328. Extending over the center of the emitter component 320 is a receiver component 330 which is mounted upon a forwardly-extending channel member 332 welded, in turn, to the upper surface of crossbrace 326. Component 330 includes a housing 334 of rectangular dimension to which electrical signal cabling 336 is connected. Similarly, signal cabling 338 is coupled with housing 322 of component 320 and a calibrating connector is seen at 340.

Looking to FIGS. 13 and 14, internal details of the receiver 330 are revealed. The housing 334 of the receiver is configured having an elongate rectangular opening therein at 342. This opening 342 is aligned in parallel with the corresponding opening 324 of the emitter component 320 as seen in FIG. 12. Over opening 342 there is located an elongate cylindrical radiation gathering lens which serves to restrict the radiation region sought to be evaluated to the general vicinity of the emitter array at opening 324 in emitter component 320. Above the lens 344, a circuit board as at 346 and a shield 348 are seen to be supported upon stand-offs 350 and 352 as seen in FIG. 3. Located intermediate the lens 344 and circuit board 346 is a support board 354 which in FIG. 14 is seen to support a linear array 356 of eight gallium-arsenide photodiodes which, when commonly employed as emitters, emit radiation in the infrared region of the electromagnetic spectrum. Preferably, these devices of the array 356 are selected such that they would emit infrared radiation at the same wavelength as the infrared radiation emitted from the emitter component 320. As the marker hole 318 passes over the scanning emitter component 320, its presence is synchronously detected at the receiver component 330 and appropriate information conveyed to process control. Emitter component 320 performs in the manner described in conjunction with FIG. 9, and the receiver component 330 performs in the manner described in connection with FIG. 10. However, the infrared detection and preamplification is altered to accommodate utilization of the device array 356.

Figure 15:
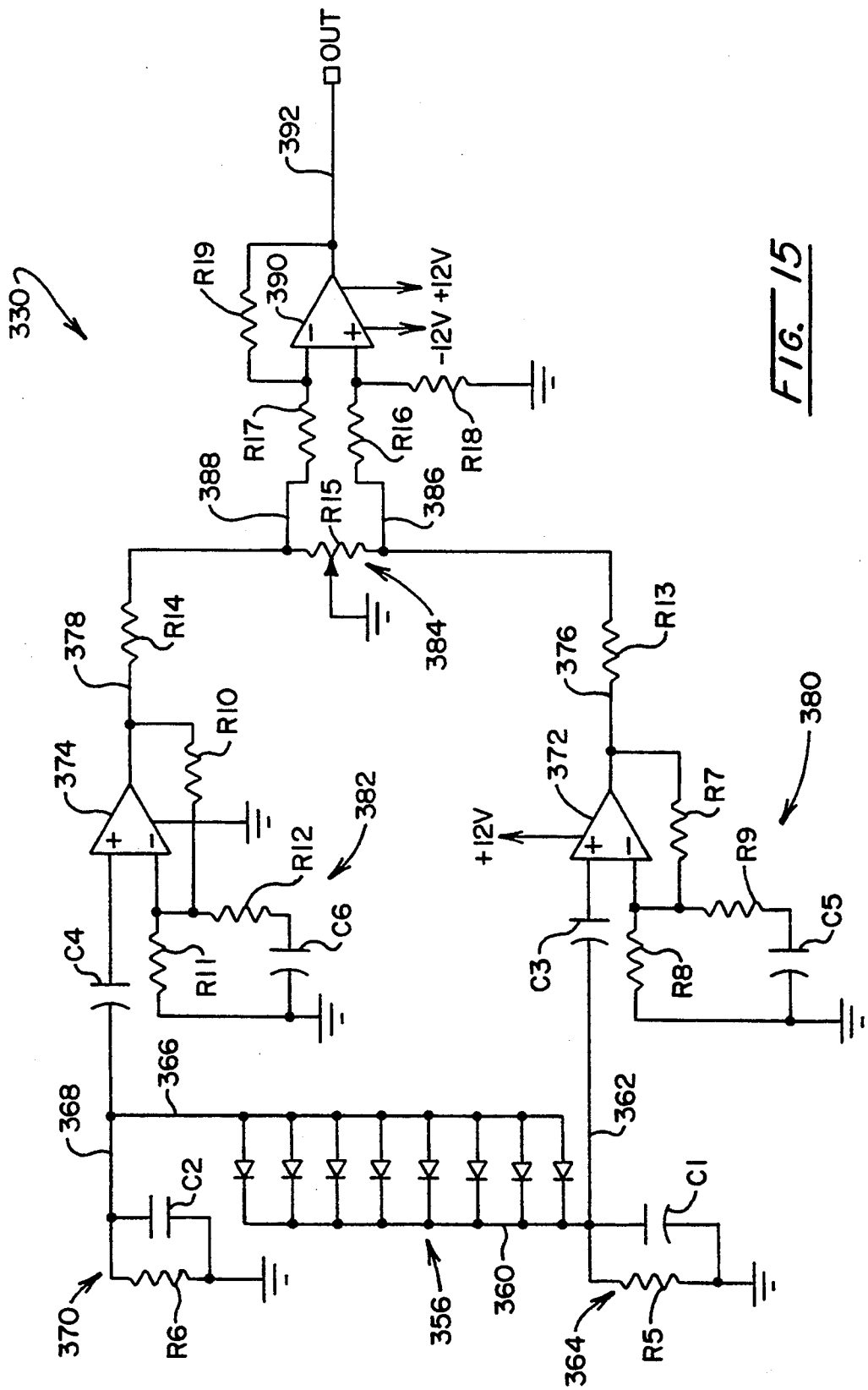
FIG. 15 is an electrical schematic diagram of a receiver circuit according to one embodiment of the invention.

Referring to FIG. 15, the infrared detector and preamplification circuit as represented at block 220 as employed with the receiver component 330 is revealed. In the figure, the array 356 of gallium-arsenide diodes again are represented at 356. When employed with the receiver component, the diodes of the array 356 are within a photoreceptor configured circuit, performing essentially as photovoltaic devices. The cathodes of the parallel coupled IR emitting diodes of the array 356 are seen to be connected by common line 360 to line 362 and network 364 incorporating capacitor C1 and resistor R5. In similar fashion, the anodes of the array 356 are coupled via common line 366 to line 368 and to network 370 incorporating resistor R6 and capacitor C2. Networks 364 and 370 compensate for the inner capacity of the diodes of array 356, the selection of values for capacitors C1 and C2 also providing for limiting frequency response at the high end such that externally generated noise is not fed to the amplification stages to follow.

Lines 362 and 368, respectively, are seen extending through coupling capacitors C3 and C4 to the positive inputs of operational amplifiers 372 and 374. Preferably exhibiting low noise and having a relative a narrow bandwidth at the frequency of interest, i.e. 20 KHz, devices 372 and 374 may, for example, be type LM387. Amplifier 372 is shown having an output at line 376 while amplifier 374, provides a similar output at line 378. Each of these amplifiers are configured with respective networks 380 and 382 of identical structuring leading to the negative inputs thereto and incorporating gain establishing feedback paths. For example, resistors R7 and R8 establish a gain of 5 to d.c. inputs, while resistors R7 and R9 provide a gain of 1,000 to the a.c. inputs. In similar fashion, at network 382, resistors R10 and R11 establish d.c. gain, while resistors R10 and R12 provide for a.c. gain. Capacitors C5 and C6 function with respective resistors R9 and R12 to provide a negative feedback path and function with respective resistors R9 and R12 to develop frequency response.

Lines 376 and 378 are seen to extend through respective resistors R13 and R14 to a voltage dividing potentiometer 384, including resistor symbol R15. Potentiometer 384 is adjustable such that the signal from line 376 exactly matches that at line 378 to effect a rejection of any common mode noise, for example, radiated noise from a power source or radio sources. The resultant signals then are presented as represented at lines 386 and 388 and respective resistors R16 and R17 to the inputs of operational amplifier 390. Device 390 may be a general purpose FET input device with a gain of 1 as developed by resistors R17 and R18. The output thereof is at line 392 which corresponds with line 222 in FIG. 10 and line 252 in FIG. 11.

Returning to FIG. 7, the performance of the above-described gallium-arsenide receiver array is revealed in conjunction with curve 124. As in the case of curve 123, the IR diode array emitting component utilized no cylindrical lens or the like to focus radiation as is the case in connection with the curve 122. The curve shows that the system drops out of saturation somewhat less than a 50 inch spacing, whereupon the curve descends with a last good signal somewhere around 100 inches spacing. The advantage of this dual infrared emitter and receiver system resides in the observation that ambient light, strobe lights, incandescent hot metal and the like no longer represent a problem to the system and substantial new applications become available.

Substantial advantages in accuracy and in available industrial applications accrue to the instant system where the intensity of radiation at the collector component is pre-adjusted such that it is substantially equal for each emitting device of the array under conditions of non-attenuation. In particular, this has been found to permit the system to locate and edge detect transparent or semi-transparent materials. Heretofore, calibration to achieve this uniform intensity at the emitter component has been developed through the use of EPROM memory in conjunction to a digital-to-analog conversion function. Thus, an ideal simplicity has been achieved through the utilization of a counter which is driven at system frequency and controlled from a sync pulse occurring at the completion of energization of the last radiation emitting device. No microprocessor system or the like is required to develop full operation of the system. Particularly where transparent or semi-transparent materials are utilized, small reflections may be picked up by the system or it may be necessary to alter the geometry of the receiver and/or emitter components of the system. With the present approach, the user or manufacturer may go to the field location, make a simple mode selection for calibration, and attach a portable computer with a calibration program to bring the system back into full and proper calibration. Alternately, the calibration approach can be utilized at initial set-up.

Figure 16:
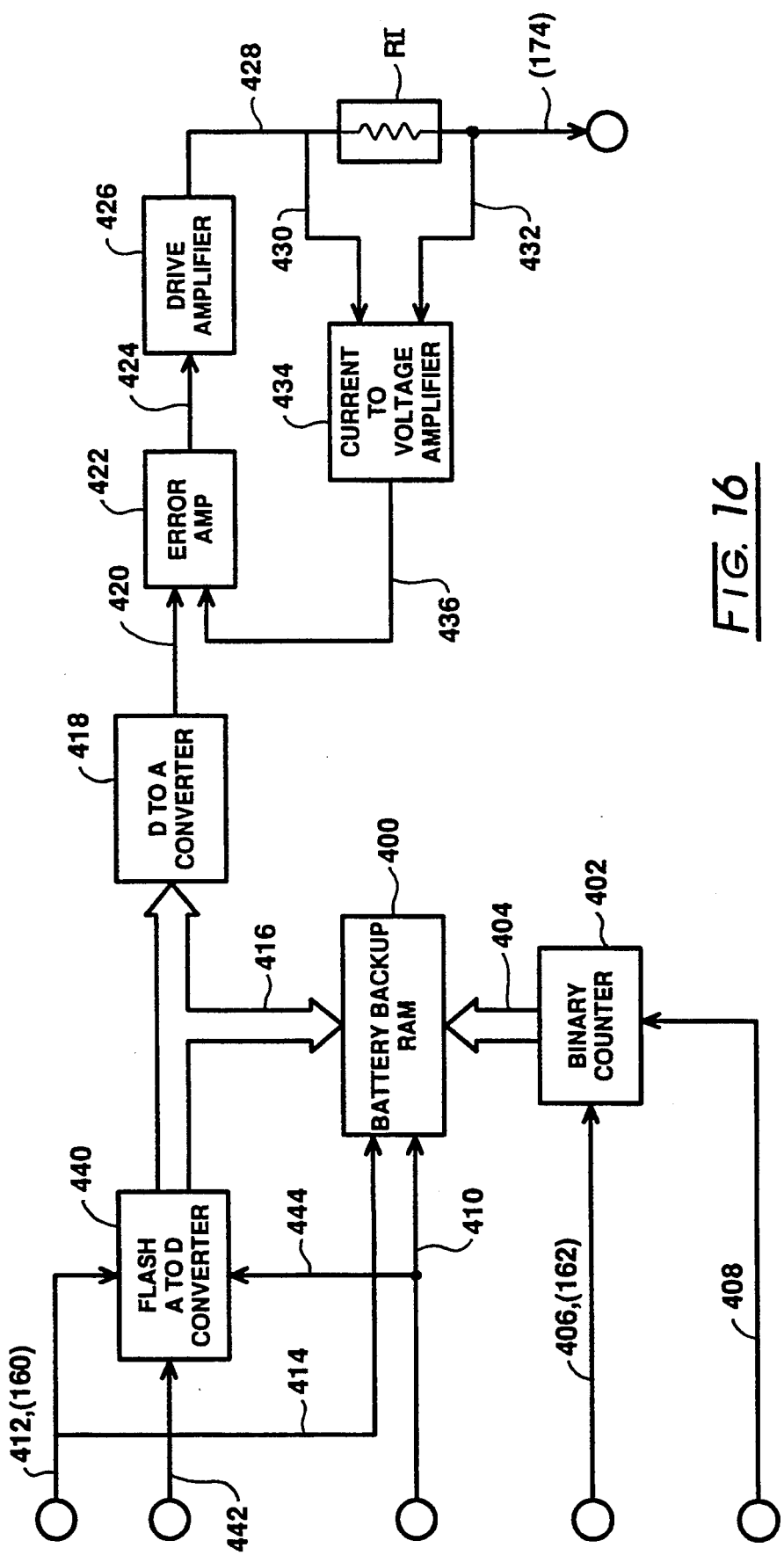
FIG. 16 is a block diagrammatic representation of an errfitter component control circuit incorporating on-site calibration features.

Looking to FIG. 16, the driving components for energizing the discrete radiation emitting devices of the array at the emitter component as modified by this on-site calibration are revealed. In the figure, values representing the energization current selected for each radiation emitting device are retained in random access memory (RAM) as represented at block 400. Device 400 may be provided, for example, as a high speed 8192×8-bit static RAM marketed as a type 5164 by Intel, Inc. RAM 400 is backed up so as to maintain its memory by a lithium battery or the like and is addressed from a binary counter 402 through bus 404. In this regard, the binary counter 402 is driven at its clock input from line 406 carrying the system frequency of 20 KHz as described earlier at line 162 in conjunction with FIG. 9. That identification also is present within parenthesis at line 406. Counter 402 is reset by a sync pulse presented at line 408 and which occurs at the termination of excitation of the last radiation emitting device within an array at the emitter component. For normal or non-calibrating operation, a mode select input is presented to RAM 400 from line 410 enabling it to perform in a write mode. Readout from RAM 400 is carried out upon the occurrence of the video sample pulse earlier described at line 160 and represented in the instant figure by lines 412 and 414. When addressed from counter 402 in a read mode, RAM 400 presents an 8-bit binary value for radiation emitting device energization via bus 416 to a digital-to-analog converter 418. Converter 418, in turn, generates an analog signal at line 420 which is presented at the reference input of an error amplifier represented at block 422. Providing any necessary adjustment, the amplifier 422 presents an output at line 424 to a drive amplifier 426. The amplifier 426 generates a current and is presented at line 428 to a precision resistor identified as RI. The voltage across this resistor RI is monitored by lines 430 and 432 and presented to a current-to-voltage amplifier represented at block 434. The output of amplifier 434 at line 436 is a voltage representing the actual current at line 428 and is presented to the opposite input of error amplifier 422. With the arrangement shown, an assurance is made that the current value at line 428, which corresponds to line 174 in FIG. 9 is that which is represented at line 420 from the converter 418.

The instant circuit also includes a flash analog-to-digital converter 440, the output of which is coupled with bus 416 and which responds to an analog input at line 442 in the presence of a video sample pulse at line 412 and a mode select condition from lines 410 and 444 to present a digital value at bus 416 corresponding with the analog input. The mode selection from lines 410 and 444 is one which additionally calls for a write mode performance at battery backed RAM 400. With the arrangement shown, the circuit of FIG. 16 may be employed with a calibration arrangement operating in conjunction with a portable computer.

Figure 17:
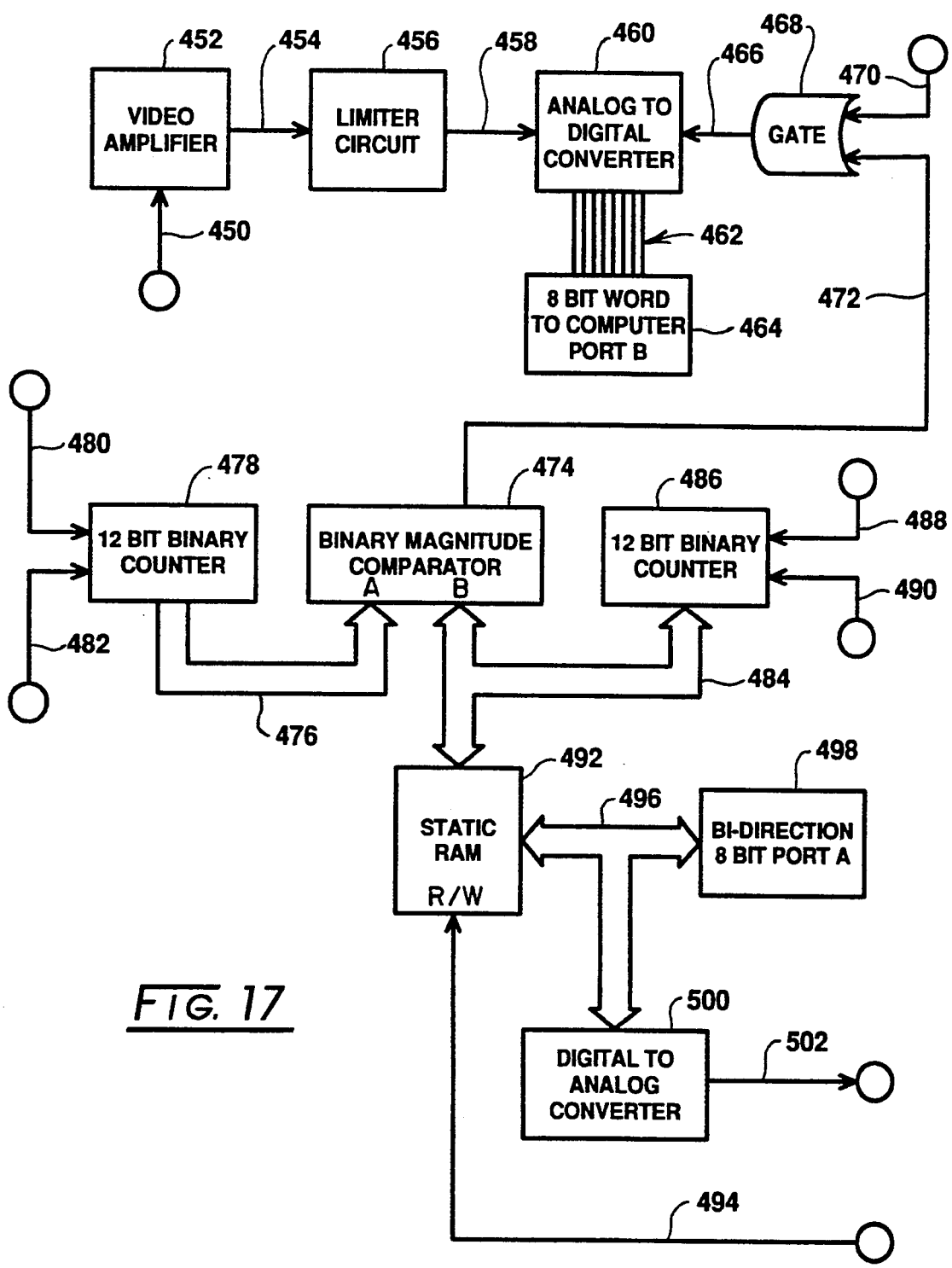
FIG. 17 is a block schematic diagram showing interface components employed in a system for carrying out the balancing of emitter components of an array thereof employed with the apparatus of the invention.

Looking to FIG. 17, a block diagrammatic representation of interface circuitry and computer functions developed for travel to the site of an installation of the instant system is revealed. Connection of this network with the system being calibrated is, for example, through connectors as described at 142 in FIG. 8 or 340 in FIG. 12. The circuit shown in the figure employs the pre-amplified video signal described in conjunction with line 222 in FIG. 10 or 252 in FIG. 11 and now represented at line 450. The video or detector signal at line 450 is introduced to an amplifier stage represented at block 452. Amplifier 452 is tuned having a band pass centered on the noted 20 KHz system frequency. The output of stage 452 at line 454 is directed to a limiter circuit represented at block 456. Circuit 456 limits the voltage excursions of the signal at line 454 for purposes of protecting a next positioned analog-to-digital converter stage. In this regard, the output of circuit 456 at line 458 is directed to analog-to-digital converter stage 460. Stage 460 receives the signal from limiter 456 which represents the positive on-half cycle of each video pulse. When triggered or activated to sample, the stage 460 will convert that analog signal to an 8-bit digital word and present it along lead array or bus 462 which is directed to a port designated as "port B" of a computer employed with the instant calibration process.

Converter 460 is instructed to sample in response to a command input at line 466 from a gate 468. One input to gate 468 emanates from line 470 or the video sampling pulse described in conjunction with line 160 in FIG. 9. The opposite input to gate 468 at line 472 is developed from the equality port or A port=B port output of a 12-bit binary magnitude comparator represented at block 474.

This gate input at line 472 serves, in general, to elect that emitting device of the emitter component array which is to be evaluated. The A port of magnitude comparator 474 is coupled via a 12-lead bus 476 to a 12-bit binary counter represented at block 478. Inputs to counter 478 includes a reset signal at line 480 from the computer employed with this procedure and an emitting device clock at the noted 20 KHz frequency emanating, however, from that same computer which is introduced from line 482. The B port input to binary magnitude comparator 474 is coupled to 12-lead bus 484 which extends to another 12-bit binary counter represented at block 486. Counter 486 is reset to signal the commencement of energization of the first radiation emitting device from the system reset signal or sync signal at line 488. The clock input to counter 486 is the system clock signal at 20 KHz as represented at 490 and described earlier in connection with line 162 in FIG. 9.

With a system 10 or 12 installed at its intended locale for operation, inputs may be asserted to counter 486 from the system and simultaneously to the video amplifier 452. The computer employed with the balancing procedure may then select any given emitting device by application of appropriate control signals to the counter 478. The resultant output at port A of magnitude comparator 474 then is compared with the binary value asserted from the system 10 itself to port B of the comparator through bus 484. In the event of coincidence between the binary value at port A with port B, a condition of A=B exists and a gating signal becomes available at line 472 which,. upon the occurrence of the system 10 sampling pulse at line 470, enables or instructs A/D converter 460 to convert a sample amplitude of illumination to an 8-bit word, which then is submitted to port B of the computer as represented at block 464.

It may be noted that bus 484 also addresses a static, random access memory (RAM) as represented at block 492. The read/write commands to RAM 492 are developed from the noted computer and provided at line 494. Thus, where a particular emitting device has been selected for evaluation by the computer, the static RAM 492 will have received that same address value at which time it may be commanded to write on its 8-bit I/O data-bus 496 the 8-bit word or value stored at that address. Accordingly, as the emitter array is scanned, each emitting device that is energized has a specific address corresponding to it in static RAM 492 and a corresponding 8-bit word at that address which represents or has a value corresponding with the drive current selected for that device. The computer also can read or write to static RAM 492 by a suitable command at line 494 provided in conjunction with an input from it at its bi-directional 8-bit port, herein designated "port A" through a bidirectional bus buffer chip as represented at block 498. In general, it will be seen that an arbitrary value is assigned at the commencement of a balancing process. As the outputs of the emitter devices then are evaluated, that value is incremented or decremented by the computer at its designated port A at block 498. The resultant incremented drive current value then may be submitted by bus 496 to a digital-to-analog converter represented at block 500. Converter 500 then may convert the binary value for drive current to an analog d.c. level for presentation along line 502. Returning momentarily to FIG. 16, line 502 is coupled to line 442 for insertion to the flash A-to-D converter 440. As indicated earlier, for this procedure, mode select line 410 is maintained at a logic level providing for a write mode of operation of battery back up RAM 400 and a conversion at converter 440.

Figure 18A:
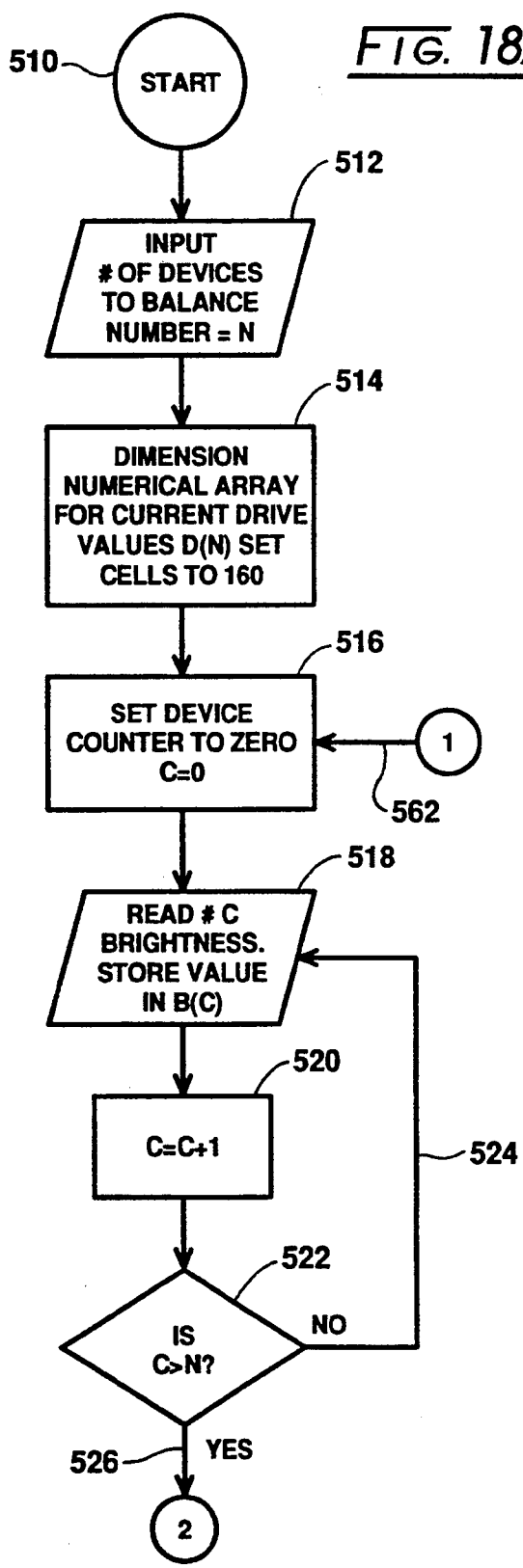
Figure 18C:
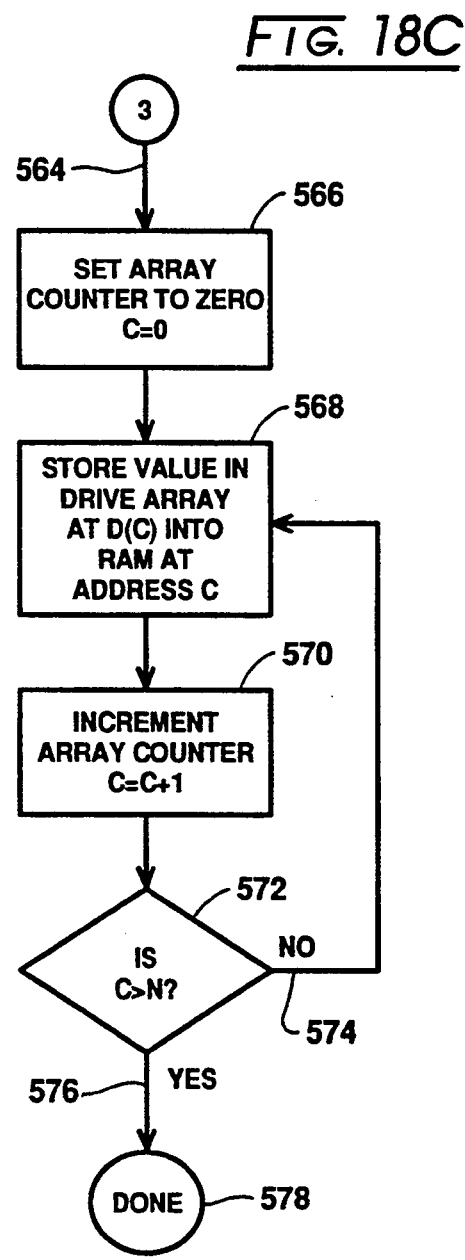

The software program under which balancing of the emitter component array is carried out is described in conjunction with FIGS. 18A–18C which are mutually associated by the numerically identified nodes positioned thereon. Looking to FIG. 18A, the program is seen to start at node 510 and, as represented at block 512, the program asks the operator to input the number of devices of the emitter component array which are to be balanced. This number is represented as "N". Then, as represented at block 514, the program dimensions a numerical array in the program which is N cells long. The first such array is to store the brightness values of the discrete devices under evaluation. The next array, designated D(N) is dimensioned having N cells. The cells of this array are filled with an arbitrary brightness number which resides somewhat intermediate the lowest value of brightness and the highest. That highest value will, for example, be 255. The arbitrarily elected value, for example 160, will be incremented or decremented as the balancing process ensues. Thus, the arbitrary value initially elected is one low enough to be incremented sufficiently and high enough so as to be decremented sufficiently where necessary. Accordingly, it is heuristically elected. The program then progresses to the procedure set forth at block 516 wherein a device counter is set to zero. This counter value is designated as "C". Next, as represented at block 518, the brightness of a counter elected device is read, for example, providing a signal at line 450 described in conjunction with FIG. 17, and the brightness value thereof is stored in the noted first array, herein designated as "B(C)". The counter then increments to the next emitting device as represented at block 520 and, the inquiry represented at block 522 is made to determine whether the counter value is greater than N, representing the completion of the array. In the event of a negative determination, then as represented by line 524, the instructions at block 518 are carded out, brightness being read and the value thereof stored. In the event of an affirmative determination at block 522, then as represented at line 526 and node 2, the program proceeds as represented in FIG. 18B. Looking to that figure, line 526 is seen being directed to the instructions at block 528. These instructions provide for the addition of the brightness values in all of the array cells and the division of them by the number of devices or cells, N, to find an average value which is designated "A". Next, as represented at block 530, the device and array counter is reset to zero and, as represented at block 532, the program commences to compare each discrete device brightness as elected by counter C and as located in the noted first array, B(C), to the average brightness, A. The program then proceeds to the inquiry set forth at block 534, If the device under investigation is brighter than average, then a function is carried out wherein the value of the device drive array is decremented by a predetermined count or number. That count or number is herein elected as one count, however, other increments may be chosen. Thus, if this were the first iteration with an arbitrary brightness selected as 160, the brightness value for the device under investigation now would be 159. Accordingly, as represented at line 536 and block 538, where the brightness value, B(C), is greater than A, the value in the device drive array is decreased for the cell and device under investigation by one count. The program then proceeds as represented by line 540 and block 542. At block 542, instructions axe provided for increasing the device and array counter or incrementing it by a value of 1.

Returning to block 534, where the brightness value within the brightness array is less than the average value, A, then as represented by line 544 and block 546, the value in the device drive array for the cell or device under consideration is increased or incremented by an arbitrary value, herein shown to be one count. The program then proceeds as represented at line 548 and block 542 wherein the array counter is incremented by 1. Where the brightness value equals the average value of brightness, then as represented at line 550, the program proceeds to the incrementation step at block 542. Following this incrementation, as represented at block 552, a determination is made as to whether all cells have been examined for this iteration of the program. In the event of a negative determination, then as represented at line 554, the program returns to the comparison step at block 532. This looping procedure will continue through, for example, 20 or 30 iterations. In the course of this activity, the operator may, for example, be observing waveform improvements on an oscilloscope, a series of sinewaves at 20 KHz being observed. Also, it is helpful to compute the maximum device intensity which has been read and a minimum device intensity read as well as the average device intensity value. As the operator observes these readouts, their convergence can be noted. When the operator determines that appropriate intensity values for the emitter devices have been achieved, the above adjustment portion of the program can be terminated by an appropriate keyboard entry. Thus, as represented at line 556 and block 558, a check is made as to whether a keyboard entry to stop the program has been made. Then as represented at block 560, where the operator has determined to permit the program to continue, as represented at line 562 and node 1, the program returns to block 516 (FIG. 18A) wherein the device counter is set to zero and the above sequence of steps again is performed.

In the event that the operator has determined that appropriate convergence and thus, an adequate balancing of the emitter radiation intensities has been achieved, then as represented at line 564 and node 3, the program proceeds to the instructions at block 566 shown in FIG. 18C. Block 566 provides for setting the array counter to zero in commencement of loading the emitter device current drive values into battery backed-up RAM 400 as described in conjunction with FIG. 16. Accordingly, as represented at block 568, the value in the device drive array, D(C) for address C is stored in the RAM 400. Then, as represented at block 570, the device array counter is incremented by 1, whereupon, as represented at block 572, a determination is made as to whether values for the entire array of emitter devices have been stored. In the event they have not, the program loops as represented at line 574 to recommence the storage activity represented at block 568. In the event of an affirmative determination at block 572, then as represented at line 576 and node 578, the balancing program is concluded.

It may be observed from the foregoing that the adjustment to emitter device drive current is made with respect to radiation intensity amplitude at the receiver component, not at the emitter component itself. Following the above balancing or optimization procedure, as one observes the emitter array while being scanned, the emitter devices therein will exhibit varying brightness. For example, those devices at the outer edges of the array will be energized by drive currents, the values of which will have been adjusted for a longer light propagation distance.

Figure 19A:
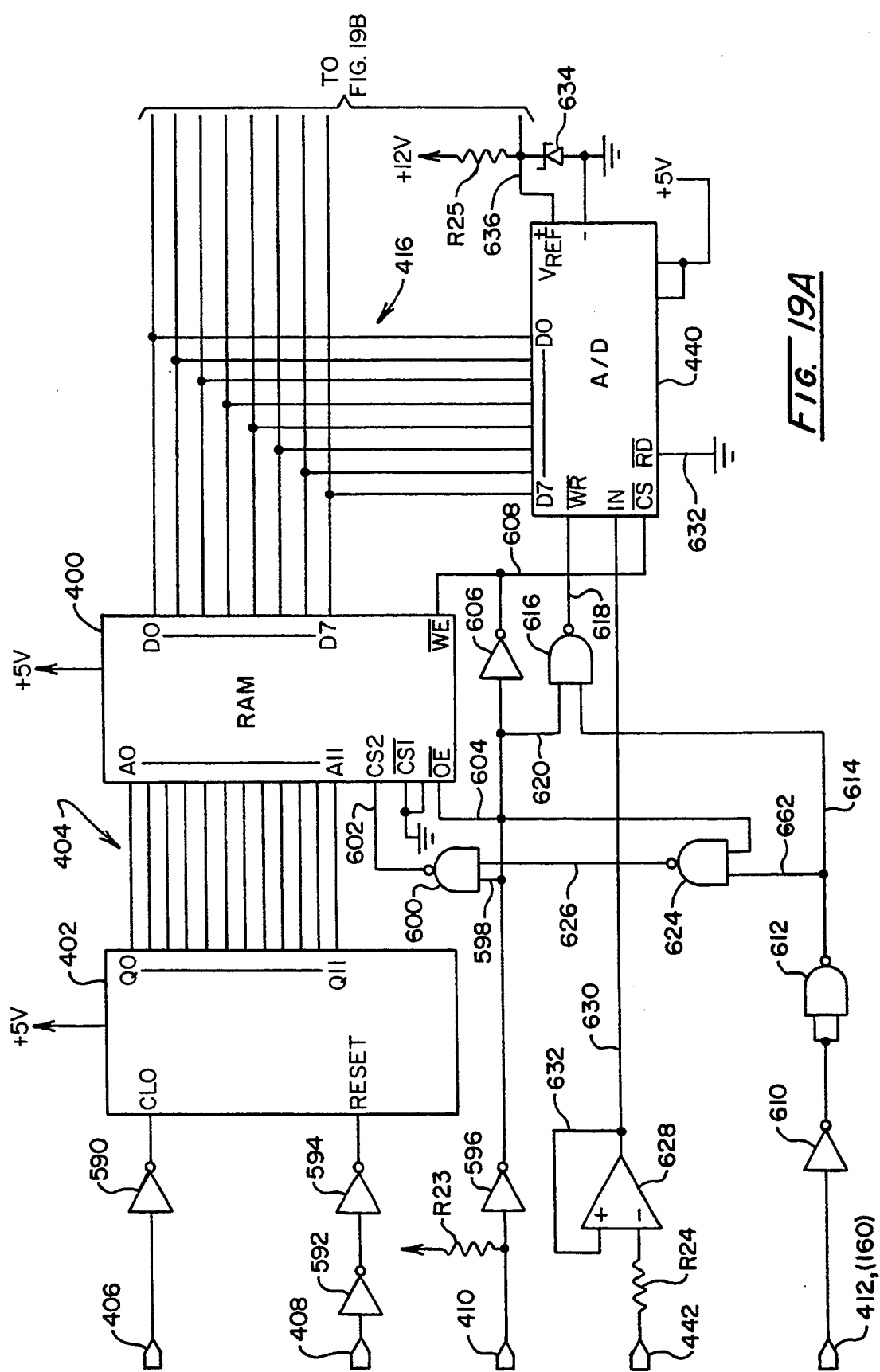
FIGS. 19A and 19B combine as labeled thereon to show an electrical schematic diagram corresponding with the block schematic diagram of FIG. 16.
Figure 19B:
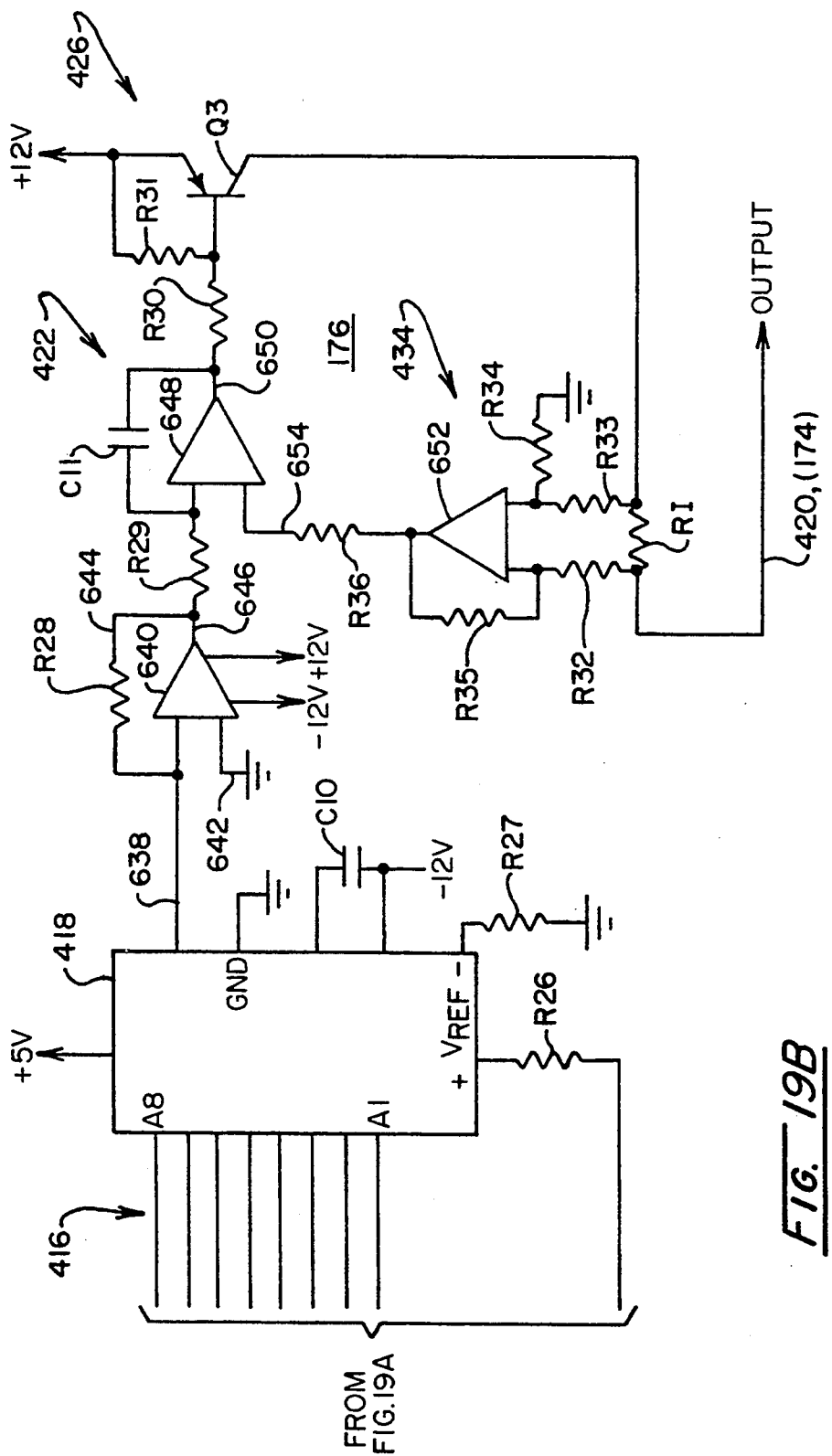

Looking to FIGS. 19A and 19B, a more detailed representation of the circuit of FIG. 16 is presented. These figures should be considered together in the manner indicated by the labeling thereon. Those components in these figures which are common with those described in connection with FIG. 16 retain the same numerical identification. In FIG. 19A, line 406, carrying the 20 KHz system scan frequency is shown directed to the input of an inverter/buffer 590 and thence to the clock input of binary counter 402. Counter 402 is a 12-bit binary counter which may be provided, for example, as a type 4040. The reset input to counter 402 is provided from line 408 which has been described as carrying the system sync signal representing completion of energization of the last emitting device in an array. This sync signal is passed through buffer inverters 592 and 594 to be presented to the reset terminal of counter 402. Inverter buffers 590, 592, and 594 may be provided, for example, as type 4049. Thus configured, the counter 402 commences at a first or zero address upon receiving a reset input and counts to the Nth or last address by address values given at bus 404 and submitted to random access memory (RAM) 400. RAM 400 is backed-up by a battery power supply (not shown) in conventional fashion. Its performance depends upon whether the program mede is at hand or not. In this regard, with the presence of a program mode, RAM 400 operates in a write mode in the course of system calibration. On the other hand, during normal, non-calibrating operation, the device 400 performs in a read mode. The election of program is made by the operator in conjunction with the signal applied at line 410. Pull-up resistor R23 is coupled to line 410, and the line is seen to be directed through buffer inverter 596 to line 598 representing one input to NAND gate 600. The output of that gate 600 at line 602 is directed to the chip select terminal of RAM 400. Additionally, line 410 is coupled through line 604 to the output enable terminal of device 400. Device 596 may be of a type 4049. With the above configuration, where program line 410 is pulled to a logic low, the resultant high logic level at line 604 causes the device 400 to enter an inactive mode rendering the outputs thereof in a tri-state condition such that the bus 416 is not overly-taxed or loaded. The program signal at line 410 also is applied through another type 4049 inverter buffer 606 and line 608 such that it is directed as a logic low value to the write enable terminal of RAM 400 as well as the chip select terminal of analog-to-digital converter 440.

Now looking to the video sample pulse at line 412, note that it is directed through an inverter buffer 610 to be presented at each input of NAND gate 612 and thence to line 614. Line 614 is directed to one input of NAND gate 616, the output of which is coupled to the write terminal of analog-to-digital converter 440 via line 618. The opposite input to gate 616 is at line 620 which, in turn, is coupled with program line 410. Thus, upon the occurrence of a video sample pulse and appropriate program command, the converter 440 will be enabled within a write mode. A video sample pulse at line 614 also is directed via line 622 to one input of NAND gate 624, the opposite input to which is received from program line 410 via line 604. The output of gate 624 at line 626 is directed to the opposite input to gate 500. Thus, the RAM 400 is enabled to read the output of converter 440 at bus 416 in the program mode. Gates 600, 612, 616, and 624 may be provided, for example, as type 4011.

During the program mode wherein calibration is carried out, the balance analog signal derived from the calibrating computer is presented from line 442 incorporating resistor R24 to one input of a non-inverting buffer 628, the output of which is presented at line 630 and from which a feedback line 632 extends to the opposite input thereto. Device 628 may be provided, for example, as a type LM353 and functions to protect the analog-to-digital converter 440. Line 630 is seen to be coupled with the analog-in terminal of converter 440.

Looking in more detail to converter 440, it may be seen that the $\overline{RD}$ terminal thereof is normally coupled to ground as represented at line 632. Provided, for example, as a type ADC0820CCN device, and is supplied a reference voltage as a precision 5 v source provided by an integrated voltage reference circuit 634 seen coupled to +12 v through resistor R25. Advantageously, that same precision source is utilized by the subsequent digital-to-analog conversion stage. In this regard, note that the voltage reference input to converter 440 is provided at line 636. That line also extends through resistor R26 to the reference input to digital-to-analog converter 418 as seen in FIG. 19B. Source 634 may be provided, for example, as a type LM336.

Looking to FIG. 19B, bus 416 is seen directed to the A1-A8 ports of digital-to-analog converter 418. Device 418 may be provided, for example, as a type 0808 digital-to-analog converter which is configured in conjunction with resistor R27 and capacitor C10. With the configuration shown, the voltage output of device 418 at line 638 will represent the reference voltage of 5 v adjusted with respect to the value of the 8-bit word asserted from memory 400 in the normal operational mode or that generated in conjunction with converter 440 in a program mode. This output is directed to the negative input of a buffer amplifier 640, the positive input to which is coupled to ground via line 642 and incorporating a feedback path 644 including resistor R28. Buffer amplifier 640 may be provided, for example, as a type LF353. The output of buffer 640 at line 646 is directed through resistor R29 to the input of operational amplifier 648 having an output at line 650 which is directed through resistor R30 to the base of PNP transistor Q3. A capacitor C11 is coupled between the output line 650 and input line 646 to prevent parasitic oscillation. The emitter of transistor Q3 is coupled to +12 v, while the collector thereof is coupled via line 420 which functions to carry the selective balancing current to each of the emitting devices of the emitter component array. Note that line 420 is coupled to a reference resistor RI, the opposite sides of which are connected by resistors R32 and R33 to the respective negative and positive inputs of an operational amplifier 652. Resistors R32-R36 associated with amplifier 652 are of equal value to produce a unity gain and the voltage output of device 652 at line 654 represents the value of current asserted at line 420 which, in turn, is asserted at the opposite input to amplifier 648. Accordingly, as a voltage level is applied from line 646 to the amplifier 648, it will adjust its output at line 650 to achieve a balance between lines 654 and 646.

Since certain changes may be made in the above-described system, method and apparatus without departing from the scope of the invention herein involved, it is intended that all matter contained in the above description or shown in the accompanying drawings shall be interpreted as illustrative and not in a limiting sense.

We claim:

1. Apparatus for locating an edge of material, comprising:
    an array of discrete radiation emitting devices located a select distance from one side of said material and extending partially outwardly from said edge, each said device being responsive to the application of current thereto to emit infra-red radiation;
    a photoresponsive receiver responsive to radiation in the visible and infra-red regions of the electromagnetic spectrum, located a stand-off distance from the opposite side of said material and positioned for response to said infra-red radiation which transitions between conditions of attenuation and non-attenuation in the vicinity of said edge to derive output signals corresponding with the amplitudes thereof;
    a drive network responsive to control inputs for applying said current to said discrete radiation emitting devices; and
    a control circuit for deriving said control inputs at a predetermined frequency and responsive to said photoresponsive receiver output signals for deriving a time-based trigger signal corresponding with the location of said edge.

2. The apparatus of claim 1 in which said radiation emitting devices are gallium-arsenide semiconductor junction devices.

3. The apparatus of claim 2 in which said photoresponsive receiver includes a silicon photodetector.

4. The apparatus of claim 3 in which said photoresponsive receiver includes an optical filter positioned to confront and transmit said radiation in the infra-red region while substantially blocking radiation in the visible region of the electromagnetic spectrum.

5. The apparatus of claim 3 in which said silicon photodetector is disposed in parallel relationship with said array of radiation emitting devices and has a lengthwise extent of about 9 cm.

6. The apparatus of claim 1 in which:
    each of said radiation emitting devices is responsive to the application of a select value of said current applied thereto;
    said drive network is responsive to said control inputs for applying said select value of current to said radiation emitting devices; and said control circuit is responsive to a predetermined drive value corresponding with each said radiation emitting device for deriving corresponding said control inputs to effect a said emission of radiation from each said device exhibiting substantially uniform intensity at said receiver when said non-attenuated by said material.

7. The apparatus of claim 6 in which said control circuit includes a memory addressable for providing said predetermined drive value corresponding with each of said radiation emitting devices.

8. The apparatus of claim 6 in which said control circuit comprises:
an oscillator for providing clock pulses occurring in a train at a predetermined system clock frequency;
a decoder circuit responsive to said cock pulses for timing the said application of current to sequentially disposed ones of said devices to occur at said predetermined frequency from the first thereof to the last thereof and deriving a sync signal at the conclusion of said application of said current to said last device;
a counter responsive to said clock pulses and said sync signal for sequentially deriving memory address values;
a memory responsive to said memory address values for providing a said predetermined drive value corresponding with each said address value;
a converter responsive to each said drive value for deriving a voltage level corresponding therewith as a said control input; and
said drive network includes a voltage-to-current converter responsive to each said converter derived voltage level to derive said select value of current.

9. The apparatus of claim 6 in which:
said material causes said radiation emitted by said devices to transition between conditions of non-attenuation and partial attenuation; and
said control circuit derives said time based trigger signal at a location in time between a transition of said output signals representing a maximum said amplitude and a minimum said amplitude.

10. The apparatus of claim 9 in which said location in time is selected in correspondence with an amplitude value occurring midway between said minimum amplitude and said maximum amplitude.

11. The apparatus of claim 1 in which:
said array of discrete radiation emitting devices extends to a furthest outwardly disposed said device located outwardly from said edge; and
said photoresponsive receiver has a finite widthwise extent, the center of which is substantially vertically aligned with said furthest outwardly disposed device.

12. The apparatus of claim 1 in which:
said material has a widthwise extent extending between oppositely disposed outside edges;
said array of discrete radiation emitting devices extends from a first said device located outwardly from one said outside edge to a last said device located outwardly from a said outside edge opposite said one outside edge;
said photoresponsive receiver has a finite widthwise extent, the center of which is substantially vertically aligned with said first device;
including a second photoresponsive receiver having a finite widthwise extent, the center of which is substantially vertically aligned with said last device, located said stand-off distance from said opposite side of said material and responsive to said infra-red radiation which transitions between conditions of attenuation and non-attenuation in the vicinity of said outside edge opposite said one outside edge to derive second output signals corresponding with the amplitudes thereof; and
said control circuit is responsive to said second output signals for deriving a time-based trigger signal corresponding with the location of said outside edge opposite said one outside edge.

13. Apparatus for locating an edge of material, comprising:
an emitter array of discrete semiconductor junction devices located a select distance from one side of said material and extending partially outwardly from said edge, each said device being within a photoemitter configuring circuit providing for the application of current thereto to effect an emission of radiation at a wavelength within the infra-red region of the electromagnetic spectrum;
a receiver located a stand-off distance from the opposite side of said material and including a said semiconductor junction device within a photoreceptor configured circuit positioned for response to said radiation which transitions between conditions of attenuation and non-attenuation in the vicinity of said edge to derive output signals corresponding with the amplitudes of said emitted radiation;
a drive network responsive to control inputs for applying said current to said discrete junction devices; and
a control circuit deriving said control inputs at a predetermined frequency and responsive to said receiver output signals for deriving an output corresponding with the location of said edge.

14. The apparatus of claim 1 in which said wavelength for said devices within said photo-emitter configured circuit and said device within said photoreceptor configured circuit is substantially identical.

15. The apparatus of claim 1 in which said semiconductor junction devices are gallium-arsenide semiconductor junction devices.

16. The apparatus of claim 1 in which said receiver includes a plurality of said semiconductor junction devices configured in a linear receiver array arranged parallel with said emitter array.

17. The apparatus of claim 1 in which:
each of said semiconductor junction devices of said emitter array is responsive to the application of a select value of said current applied thereto;
said drive network is responsive to said control inputs for applying said select value of current to said semiconductor junction devices of said emitter array; and
said control circuit is responsive to a predetermined drive value corresponding with each said semiconductor junction device of said emitter array for deriving corresponding said control inputs to effect a said emission of radiation from each said device of said emitter array which exhibits substantially uniform intensity at said receiver when non-attenuated by said material.

18. The apparatus of claim 17 in which:
said material causes said emitted radiation to transition between conditions of non-attenuation and partial attenuation; and said control circuit derives said output as a time based trigger signal at a location in time between a transition of said output signals representing a maximum said amplitude and a minimum said amplitude.

19. Apparatus for detecting the presence of a marker opening within a region of a substantially continuous sheet of material moving along a process path, comprising:

an emitter array of discrete semiconductor junction devices located a distance from one side of said sheet of material at said region, each said device being a component of a photoemitter configuring circuit providing for the application of current thereto to effect emission of radiation at a given wavelength within the infra-red region of the electromagnetic spectrum;

a receiver located a stand-off distance from the opposite side of said material and including a said semiconductor junction device as a component within a photoreceptor configured circuit, said receiver being positioned for response to said radiation transmitted through said marker opening to derive output signals;

a drive network responsive to control inputs for applying said current to said semiconductor junction devices of said emitter array;

a control circuit for deriving said control inputs at a predetermined frequency and responsive to said receiver output signals for deriving an output detecting said opening.

20. The apparatus of claim 19 in which said semiconductor junction devices are gallium-arsenide photodiodes.

21. Apparatus for locating an edge of material, comprising:

an array of discrete radiation emitting devices, said array having a first row of a plurality of mutually spaced apart said devices commencing with a first said device, and having a second row of a plurality of spaced apart said devices commencing with a first said device, said second row of said devices being offset from said first row of said devices a predetermined distance, said array being located a select distance from one side of said material and extending partially outwardly from said edge, each said device being responsive to the application of a value of current thereto to emit said radiation;

a radiation responsive receiver located a predetermined stand-off distance from the opposite side of said material and positioned for response to said radiation emitted by said devices which transitions between conditions of attenuation and non-attenuation in the vicinity of said edge to derive output signals corresponding with the amplitude thereof;

a drive network responsive to control inputs for applying said current to said discrete radiation emitting devices; and a control circuit for deriving said control inputs to apply said current to said discrete radiation devices which effects the application of current to a said device of said second row next in sequence following the application of current to an adjacently disposed device of said first row.

22. The apparatus of claim 21 in which said first and second rows of said devices are linear and aligned in mutually parallel adjacency with a scan path.

23. The apparatus of claim 22 in which said radiation emitting devices within each said first and second row are mutually spaced apart a fixed distance, and said first device within said second row is offset along said scan path from said first device in said first row an amount less than said fixed distance.

24. In a system for locating the edge of material under movement across a process location, wherein an array of radiation emitting devices are positioned from first to last along a scan path at an operational location spaced from said material and extending outwardly from said edge, said devices being energized in response to the application of drive current thereto to emit radiation of given intensity, and a receiver is spaced from the opposite side of said material an operational distance from said array of devices and provides output signals of amplitude varying with said intensity of emitted radiation modulated with respect to the attenuation thereof by said material, the method for optimizing the radiation emission performance of said devices, comprising the steps of:

positioning said receiver at said operational distance from said array at the situs of said process location without the presence of said material;

providing memory responsive to a write mode input to record drive current values and to a read mode to provide memory retained drive current values when addressed at address locations corresponding with said first-to-last device positions;

providing an analog-to-digital converter responsive to an analog input to derive said drive current values;

providing a drive network responsive to said drive current values to derive said drive currents for energizing said devices;

determining an initial value for said drive current;

applying said initial value as a said analog input to said analog-to-digital converter to derive a corresponding initial drive current value and deriving therefrom an initial value of drive current by said drive network to initially energize each said emitting device and deriving a said output signal with said receiver corresponding with the intensity of emitted radiation of each when detected by said receiver;

summing said derived output signals and dividing said sum by the number of said devices to provide an average value thereof;

test energizing each said device by applying to said analog-to-digital converter a said analog input representing a value for said drive current which has been adjusted by an incremental value effecting a convergence of the value of output signals representing said adjusted drive current with said average value;

deriving a said output signal with said receiver corresponding with the intensity of radiation received from each said device; and reiterating said steps of test energizing each said device, and deriving a said output signal until a set of final values of drive current are produced represneting a select convergence between said derived output signals and an average value thereof.

25. The method of claim 24 including the step of recording said final values in said memory in the presence of said write mode input.

26. The method of claim 24 wherein said step reiterating said steps of test energizing each said device and deriving a said output signal includes the step of summing said derived output signals and dividing said sum by number of said devices to provide a revised said average value thereof.

* * * * *